United States Patent
Yoshida et al.

(10) Patent No.: US 9,235,305 B2
(45) Date of Patent: Jan. 12, 2016

(54) COORDINATE POSITION DETECTION APPARATUS

(75) Inventors: Takehisa Yoshida, Osaka (JP); Fumikazu Shimoshikiryoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/119,897

(22) PCT Filed: Jun. 4, 2012

(86) PCT No.: PCT/JP2012/064357
§ 371 (c)(1),
(2), (4) Date: Nov. 25, 2013

(87) PCT Pub. No.: WO2012/169454
PCT Pub. Date: Dec. 13, 2012

(65) Prior Publication Data
US 2014/0125628 A1  May 8, 2014

(30) Foreign Application Priority Data
Jun. 8, 2011 (JP) .................................. 2011-128536

(51) Int. Cl.
*G06F 3/044* (2006.01)

(52) U.S. Cl.
CPC ....................................... *G06F 3/044* (2013.01)

(58) Field of Classification Search
USPC ............ 345/173–175, 207; 178/18.01–18.06; 349/116
See application file for complete search history.

(56) References Cited

U.S. PATENT DOCUMENTS

| 5,790,106 A | 8/1998 | Hirano et al. |
| 2010/0007628 A1* | 1/2010 | Eriguchi et al. ............... 345/174 |

(Continued)

FOREIGN PATENT DOCUMENTS

| JP | 08-095701 A | 4/1996 |
| JP | 8-137607 A | 5/1996 |
| JP | 2009-505209 A | 2/2009 |
| JP | 2010-231301 A | 10/2010 |
| WO | 2007/017848 A2 | 2/2007 |

(Continued)

OTHER PUBLICATIONS

Official Communication issued in International Patent Application No. PCT/JP2012/064357, mailed on Sep. 4, 2012.

*Primary Examiner* — Shaheda Abdin
(74) *Attorney, Agent, or Firm* — Keating & Bennett, LLP

(57) ABSTRACT

A configuration of a coordinate position detection apparatus is provided that provides a sufficient sensitivity even in the case of a larger device. A coordinate position detection apparatus (100) includes: a first sensor electrode ($X_i$); a first capacitance detector (21) connected with the first sensor electrode ($X_i$) and including an integration circuit; a second sensor electrode ($Y_j$); a second capacitance detector (22) connected with the second sensor electrode ($Y_j$) and including an integration circuit; a coordinate computing unit (25); and a coordinate pointing device (30). In this coordinate position detection apparatus (100), when it is in a first input mode where the coordinate pointing device (30) inputs a coordinate position, a plurality of first and second capacitance detectors (21) and (22) are configured to detect a signal provided by the coordinate pointing device (30), and the coordinate pointing device (30) performs charging and the plurality of first and second capacitance detectors (21) and (22) perform integration during a unit detection period to measure capacitances. Based on the capacitances, the coordinate computing unit (25) determines the coordinate position.

8 Claims, 18 Drawing Sheets

(56) References Cited

U.S. PATENT DOCUMENTS

2010/0066693 A1* 3/2010 Sato et al. .................... 345/173
2010/0085322 A1* 4/2010 Mamba et al. ............... 345/173

FOREIGN PATENT DOCUMENTS

WO    2007/017848 A3    2/2007
WO    2007/116557 A1    10/2007

* cited by examiner

Fig.17

| SUB PERIOD | OUTPUT VOLTAGE OF PEN | | | | | OUTPUT FROM INTEGRATION CIRCUIT OF SENSOR | | | | | | | | | | | | | | | |
|---|---|---|---|---|---|---|---|---|---|---|---|---|---|---|---|---|---|---|---|---|---|
| | $VP_1$ | $VP_2$ | $VP_3$ | $VP_4$ | | $X_1$ | $X_2$ | $X_3$ | $X_4$ | $X_5$ | $X_6$ | $X_7$ | $X_8$ | $X_9$ | $X_{10}$ | $Y_1$ | $Y_2$ | $Y_3$ | $Y_4$ | $Y_5$ | $Y_6$ |
| tp1 | 1 | 1 | 1 | 1 | Vout1 | 0 | 2 | 0 | 1 | 0 | 0 | 0 | 1 | 0 | 0 | 0 | 2 | 0 | 1 | 1 | 1 |
| tp2 | 1 | −1 | 1 | −1 | Vout2 | 0 | 0 | 0 | 1 | 0 | 0 | 0 | −1 | 0 | 0 | 0 | 0 | 0 | 1 | 0 | −1 |
| tp3 | 1 | 1 | −1 | −1 | Vout3 | 0 | 2 | 0 | 1 | 0 | 0 | 0 | −1 | 0 | 0 | 0 | 2 | 0 | −1 | 0 | 1 |
| tp4 | 1 | −1 | −1 | 1 | Vout4 | 0 | 0 | 0 | −1 | 0 | 0 | 0 | 1 | 0 | 0 | 0 | 2 | 0 | −1 | 0 | −1 |
| tp1 | 1 | 1 | 1 | 1 | Vout1 | 0 | 2 | 0 | 1 | 0 | 0 | 0 | 1 | 0 | 0 | 0 | 2 | 0 | 1 | 1 | 1 |
| tp2 | 1 | −1 | 1 | −1 | Vout2 | 0 | 0 | 0 | 1 | 0 | 0 | 0 | −1 | 0 | 0 | 0 | 0 | 0 | 1 | 0 | −1 |
| tp3 | 1 | 1 | −1 | −1 | Vout3 | 0 | 2 | 0 | −1 | 0 | 0 | 0 | −1 | 0 | 0 | 0 | 2 | 0 | −1 | 0 | 1 |
| tp4 | 1 | −1 | −1 | 1 | Vout4 | 0 | 0 | 0 | 1 | 0 | 0 | 0 | 1 | 0 | 0 | 0 | 2 | 0 | −1 | 0 | −1 |
| tp1 | 1 | 1 | 1 | 1 | Vout1 | 0 | 2 | 0 | 1 | 0 | 0 | 0 | 1 | 0 | 0 | 0 | 2 | 0 | 1 | 1 | 1 |
| tp2 | 1 | −1 | 1 | −1 | Vout2 | 0 | 0 | 0 | 1 | 0 | 0 | 0 | −1 | 0 | 0 | 0 | 0 | 0 | 1 | 0 | −1 |

Fig.18

| | | INPUT CAPACITANCE OF SENSOR | | | | | | | | | | | | | | | | |
|---|---|---|---|---|---|---|---|---|---|---|---|---|---|---|---|---|---|---|
| | | $X_1$ | $X_2$ | $X_3$ | $X_4$ | $X_5$ | $X_6$ | $X_7$ | $X_8$ | $X_9$ | $X_{10}$ | $Y_1$ | $Y_2$ | $Y_3$ | $Y_4$ | $Y_5$ | $Y_6$ |
| 1st DETECTION PERIOD | $C_1$ | 0 | 4 | 0 | 0 | 0 | 0 | 0 | 0 | 0 | 0 | 0 | 4 | 0 | 0 | 0 | 0 |
| | $C_2$ | 0 | 4 | 0 | 0 | 0 | 0 | 0 | 0 | 0 | 0 | 0 | 0 | 0 | 0 | 0 | 4 |
| | $C_3$ | 0 | 0 | 0 | 4 | 0 | 0 | 0 | 0 | 0 | 0 | 0 | 0 | 0 | 4 | 0 | 0 |
| | $C_4$ | 0 | 0 | 0 | 0 | 0 | 0 | 0 | 4 | 0 | 0 | 0 | 4 | 0 | 0 | 0 | 0 |
| 2nd DETECTION PERIOD | $C_1$ | 0 | 4 | 0 | 0 | 0 | 0 | 0 | 0 | 0 | 0 | 0 | 4 | 0 | 0 | 0 | 0 |
| | $C_2$ | 0 | 4 | 0 | 0 | 0 | 0 | 0 | 0 | 0 | 0 | 0 | 0 | 0 | 0 | 0 | 4 |
| | $C_3$ | 0 | 0 | 0 | 4 | 0 | 0 | 0 | 0 | 0 | 0 | 0 | 0 | 0 | 4 | 0 | 0 |
| | $C_4$ | 0 | 0 | 0 | 0 | 0 | 0 | 0 | 4 | 0 | 0 | 0 | 4 | 0 | 0 | 0 | 0 |
| 3rd DETECTION PERIOD | $C_1$ | 0 | 4 | 0 | 0 | 0 | 0 | 0 | 0 | 0 | 0 | 0 | 4 | 0 | 0 | 0 | 0 |
| | $C_2$ | 0 | 4 | 0 | 0 | 0 | 0 | 0 | 0 | 0 | 0 | 0 | 0 | 0 | 0 | 0 | 4 |

Fig. 23

| SUB PERIOD | OUTPUT VOLTAGE OF OSCLATOR CIRCUIT OF CENSOR | | | | | OUTPUT FROM INTEGRATION CIRCUIT OF CENSOR | | | |
|---|---|---|---|---|---|---|---|---|---|
| | $VY_1$ | $VY_2$ | $VY_3$ | $VY_4$ | | $X_1$ | $X_2$ | $X_3$ | $X_4$ |
| tp1 | 1 | 1 | 1 | 1 | Vout1 | 2 | 0 | 2 | 1 |
| tp2 | 1 | 1 | -1 | 1 | -1 Vout2 | 0 | 0 | 0 | 1 |
| tp3 | 1 | 1 | 1 | -1 | -1 Vout3 | 0 | 0 | 0 | -1 |
| tp4 | 1 | 1 | -1 | -1 | 1 Vout4 | 0 | 0 | -2 | -1 |
| tp1 | 1 | 1 | 1 | 1 | 1 Vout1 | 2 | 0 | 2 | 1 |
| tp2 | 1 | 1 | 1 | 1 | -1 Vout2 | 0 | 0 | 0 | 1 |
| tp3 | 1 | 1 | 1 | -1 | -1 Vout3 | 0 | 0 | 0 | -1 |
| tp4 | 1 | 1 | -1 | -1 | 1 Vout4 | 0 | 0 | -2 | -1 |
| tp1 | 1 | 1 | 1 | 1 | 1 Vout1 | 2 | 0 | 2 | 1 |
| tp2 | 1 | 1 | -1 | 1 | -1 Vout2 | 0 | 0 | 0 | 1 |

Fig.24

| | $C_{p,q}$ | $X_1$ (p=1) | $X_2$ (p=2) | $X_3$ (p=3) | $X_4$ (p=4) |
|---|---|---|---|---|---|
| 1st DETECTION PERIOD | $Y_1$ (q=1) | 0 | 0 | 0 | 0 |
| | $Y_2$ (q=2) | 0 | 4 | 0 | 0 |
| | $Y_3$ (q=3) | 0 | 4 | 0 | 0 |
| | $Y_4$ (q=4) | 0 | 0 | 0 | 4 |
| 2nd DETECTION PERIOD | $Y_1$ (q=1) | 0 | 0 | 0 | 0 |
| | $Y_2$ (q=2) | 0 | 4 | 0 | 0 |
| | $Y_3$ (q=3) | 0 | 4 | 0 | 0 |
| | $Y_4$ (q=4) | 0 | 0 | 0 | 4 |
| 3rd DETECTION PERIOD | $Y_1$ (q=1) | 0 | 0 | 0 | 0 |
| | $Y_2$ (q=2) | 0 | 4 | 0 | 0 |

# COORDINATE POSITION DETECTION APPARATUS

TECHNICAL FIELD

The present invention relates to coordinate position detection apparatus.

BACKGROUND ART

Coordinate position detection apparatus are known where a touch pen including an oscillator circuit emits a signal to allow a coordinate position to be detected.

JP Hei08(1996)-095701 A discloses a transparent digitizer that can also serve as a touch panel and can be switched between pen-input mode and finger-input mode. In this transparent digitizer-cum-touch panel, an analog multiplexer selects two line-shaped coordinate detection electrodes, and a balanced AC signal supplied to such a coordinate detection electrode is detected by a differential amplifier to determine the coordinate position.

DISCLOSURE OF THE INVENTION

In the arrangement disclosed in the above document, coordinate detection electrodes must be scanned successively, thus providing an insufficient sensitivity in the case of a larger operation surface (i.e. a larger number of coordinate detection electrodes).

An object of the present invention is to provide a configuration of a coordinate position detection apparatus that provides a sufficient sensitivity even in the case of a larger device.

A coordinate position detection apparatus disclosed hereinafter includes: a first sensor electrode; a first capacitance detector connected with the first sensor electrode and including an integration circuit; a second sensor electrode; a second capacitance detector connected with the second sensor electrode and including an integration circuit; a coordinate computing unit; and a coordinate pointing device. In this coordinate position detection apparatus, when it is in a first input mode where the coordinate pointing device inputs a coordinate position, a plurality of first and second capacitance detectors are configured to detect a signal provided by the coordinate pointing device, and the coordinate pointing device performs charging and the plurality of first and second capacitance detectors perform integration during a unit detection period to measure capacitances. Based on the capacitances, the coordinate computing unit determines the coordinate position.

The present invention will provide a configuration of a coordinate position detection apparatus that provides a sufficient sensitivity even in the case of a larger device.

BRIEF DESCRIPTION OF THE DRAWINGS

FIG. 17 illustrates examples of outputs provided when the touch pens are disposed as shown in FIG. 14.

FIG. 18 is a table of examples of outputs provided by the coordinate computing unit converting the examples of outputs of FIG. 17.

FIG. 23 is a table of examples of outputs provided when fingers are in contact with the sensor unit 10 as shown in FIG. 20.

FIG. 24 is a table of examples of outputs provided by the coordinate computing unit converting the examples of outputs of FIG. 23.

EMBODIMENTS FOR CARRYING OUT THE INVENTION

Figure 1:
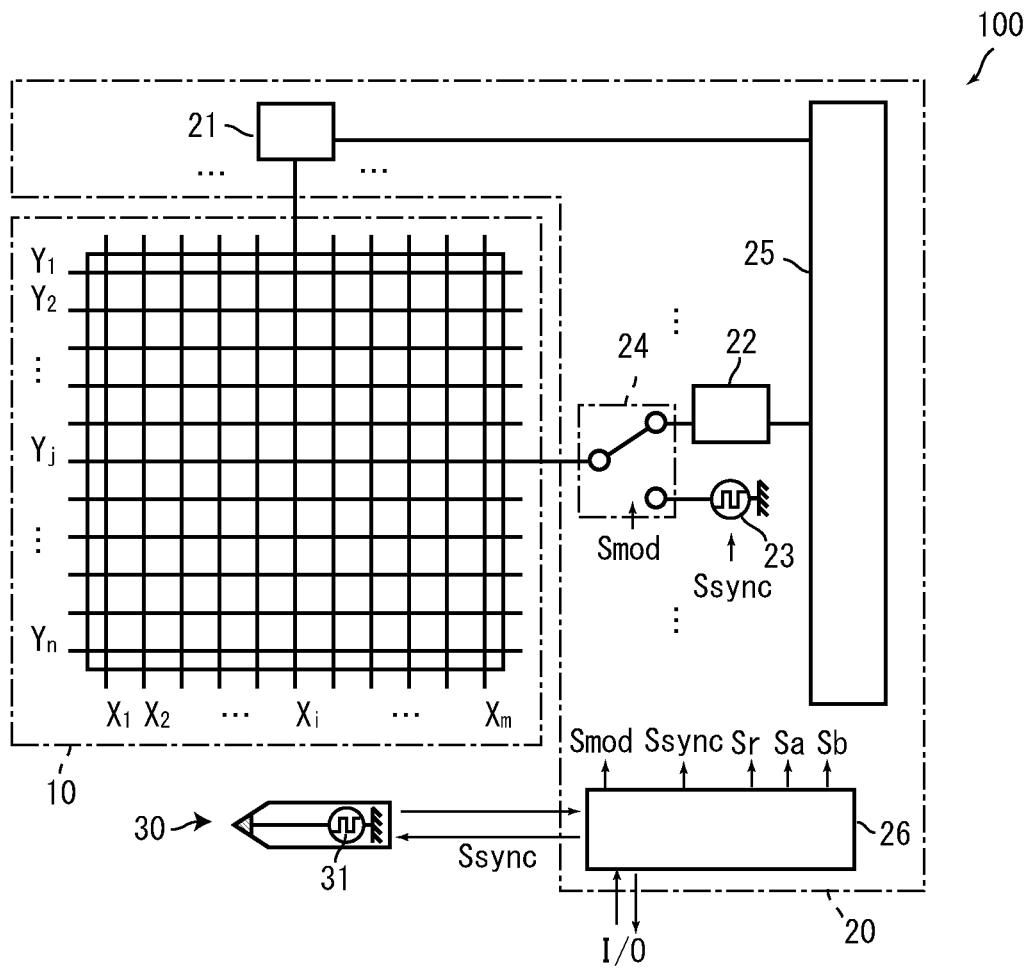
FIG. 1 is a block diagram schematically illustrating a coordinate position detection apparatus according to a first embodiment of the present invention.

A coordinate position detection apparatus disclosed hereinafter includes: a first sensor electrode; a first capacitance detector connected with the first sensor electrode and including an integration circuit; a second sensor electrode; a second capacitance detector connected with the second sensor electrode and including an integration circuit; a coordinate computing unit; and a coordinate pointing device. In this coordinate position detection apparatus, when it is in a first input mode where the coordinate pointing device inputs a coordinate position, a plurality of first and second capacitance detectors are configured to detect a signal provided by the coordinate pointing device, and the coordinate pointing device performs charging and the plurality of first and second capacitance detectors perform integration during a unit detection period to measure capacitances. Based on the capacitances, the coordinate computing unit determines the coordinate position (first arrangement).

According to this arrangement, a signal provided by the coordinate pointing device is detected by a plurality of first and second capacitance detectors. This will reduce the time required for capacitance detection compared with implementations where each electrode is scanned successively. This will provide a sufficient sensitivity even in the case of a larger device.

Starting from the first arrangement, a selector switch provided between the second sensor electrode and the second capacitance detector and an oscillator circuit connected with one switching connection of the selector switch may further be included. In this arrangement, when the apparatus is in a second input mode where a coordinate position is input by a coordinate pointing means other than the coordinate pointing device, the selector switch causes the second sensor electrode to be connected with the oscillator circuit, a plurality of first capacitance detectors detect a signal provided by the oscillator circuit, the oscillator circuit performs charging and the plurality of first capacitance detectors perform integration during the unit detection period to measure capacitances, and based on the capacitances, the coordinate computing unit determines the coordinate position (second arrangement).

According to this arrangement, the selector switch switches the apparatus between the first input mode and the second input mode. Thus, a single device can handle input by the coordinate pointing device and input by a coordinate pointing means other than the coordinate pointing device. Further, when the apparatus is in the second input mode, a plurality of first capacitance detectors detect signals provided by the oscillator circuit, reducing the time required for capacitance detection compared with implementations where each electrode is scanned successively. This will provide a sufficient sensitivity even in the case of a larger device.

Starting from the second arrangement, an input mode switching unit configured to switch the apparatus between the first input mode and the second input mode successively during the unit detection period may be further included (third arrangement).

According to this arrangement, the user can perform input by the coordinate pointing device and input by a coordinate pointing means other than the coordinate pointing device without being aware of the input mode.

Starting from the second or third embodiment, the coordinate computing unit may determine the coordinate position based on the signals provided by a plurality of oscillator circuits in a time division manner when the apparatus is in the second input mode (fourth arrangement).

Starting from the second or third embodiment, the coordinate computing unit may determine the coordinate position based on signals perpendicular to each other provided by a plurality of oscillator circuits when the apparatus is in the second input mode (fifth arrangement).

Starting from the fifth arrangement, the signals perpendicular to each other provided by the plurality of oscillator circuits may include bit strings with +1 and −1 (sixth arrangement).

Starting from any one of the first to sixth arrangements, the coordinate computing unit may determine the coordinate position of each of a plurality of coordinate pointing devices based on signals provided by the plurality of coordinate pointing devices in a time division manner when the apparatus is in the first input mode (seventh arrangement).

Starting from any one of the first to sixth arguments, the coordinate computing unit may determine the coordinate position of each of a plurality of coordinate pointing devices based on signals perpendicular to each other provided by the plurality of coordinate pointing devices when the apparatus is in the first input mode (eighth arrangement).

Starting from the eighth arrangement, the signals perpendicular to each other provided by the plurality of coordinate pointing devices may include bit strings with +1 and −1 (ninth arrangement).

EMBODIMENTS

Embodiments of the present invention will be described in detail with reference to the drawings. The same or corresponding components in the drawings are labeled with the same characters and their description will not be repeated.

First Embodiment

FIG. 1 is a block diagram schematically illustrating a coordinate position detection apparatus 100 according to a first embodiment of the present invention. The coordinate position detection apparatus 100 includes a sensor unit 10, a drive unit 20, and a touch pen 30 (coordinate pointing device). In the coordinate position detection apparatus 100, the sensor unit 10 and drive unit 20 may be provided on a single substrate, or the drive unit 20 may be provided, partially or entirely, on a flexible printed board, for example.

The sensor unit 10 includes m first sensor electrodes $X_1$ to $X_m$ and n second sensor electrodes $Y_1$ to $Y_n$. Each of n and m is an integer not less than two. The numbers n and m of sensor electrodes are dependent on the size of the sensor unit 10 and the resolution required.

In the following description, a left-to-right direction as viewed looking at FIG. 1 will be referred to as an X direction, and a top-to-bottom direction a Y direction. The first sensor electrodes $X_1$ to $X_m$ extend in a Y direction and are arranged regularly in an X direction with an equal distance. The second sensor electrodes $Y_1$ to $Y_n$ extend in an X direction and are arranged regularly in a Y direction with an equal distance. As discussed below, the first sensor electrodes $X_1$ to $X_m$ sense the position of the touch pen 30, the finger or the like in contact with the sensor unit 10 in X direction resolution. The second sensor electrodes $Y_1$ to $Y_n$ sense the position in Y direction resolution.

The present embodiment shows an implementation where the first sensor electrodes $X_1$ to $X_m$ and the second sensor electrodes $Y_1$ to $Y_n$ are perpendicular to each other; however, they may cross each other obliquely. Further, the first sensor electrodes $X_1$ to $X_m$ and the second sensor electrodes $Y_1$ to $Y_n$ may have any shape.

The driver unit 20 includes m first capacitance detectors 21, n second capacitance detectors 22, n oscillator circuits 23, n selector switches 24, one coordinate computing unit 25, and one controller 26.

The number of first capacitance detectors 21, m, is equal to the number of first sensor electrodes $X_1$ to $X_m$. FIG. 1 only shows one first capacitance detector 21 and does not show the other ones. Each of the first sensor electrodes $X_1$ to $X_m$ is connected with one first capacitance detector 21. All the first capacitance detectors 21 are connected with the coordinate computing unit 25. Each first capacitance detector 21 measures the electrostatic capacitance of the first sensor electrode Xi (i is an integer of 1 to m; the same applies hereinafter) connected with itself, and supplies it to the coordinate computing unit 25.

The number of second capacitance detectors 22, oscillator circuits 23 and selector switches 24, n, is equal to the number of the second sensor electrodes $Y_1$ to $Y_n$. FIG. 1 only shows one second capacitance detector 22, oscillator circuit 23 and selector switch 24, and does not show the other ones. Each of the second sensor electrodes $Y_1$ to $Y_n$ is connected with one connection of one selector switch 24.

A selector switch 24 switches between the associated second capacitance detector 22 and the associated oscillator circuit 23 for connection to the second sensor electrode Yj (j is an integer of 1 to n; the same applies hereinafter) connected with this selector switch 24. The selector switch 24 is controlled by a switch signal Smod provided by the controller 26. As discussed below, when the apparatus is in pen-input mode where a coordinate is input by the touch pen 30 (i.e. the first input mode), the second sensor electrode $Y_j$ is connected with the second capacitance detector 22. When the apparatus is in finger-input mode where a coordinate is input by a coordinate pointing means other than the touch pen 30, such as a finger (i.e. the second input mode), the second sensor electrode $Y_j$ is connected with the oscillator circuit 23. Instead of the finger, the input means for the second input mode may be a pen without an oscillator circuit, or a stick, for example.

All the second capacitance detectors 22 are connected with the coordinate computing unit 25. When the apparatus is in pen-input mode, each second capacitance detector 22 measures the capacitance of the second sensor electrode $Y_j$ connected with itself, and supplies it to the coordinate computing unit 25.

When the apparatus is in finger-input mode, each oscillator circuit 23 supplies a predetermined signal to the second sensor electrode $Y_j$ connected with itself.

The coordinate computing unit 25 receives signals from the first and second capacitance detectors 21 and 22, and performs predetermined operations to determine the coordinate position.

The controller 26 controls the first capacitance detectors 21, second capacitance detectors 22, oscillator circuits 23, selector switches 24 and coordinate computing unit 25 in a synchronized manner. Specifically, the controller 26 supplies a synchronization signal Ssync to the oscillator circuits 23 and coordinate computing unit 25. The controller 26 supplies control signals Sr, Sa and Sb to the first and second capacitance detectors 21 and 22.

The controller 26 communicates with the touch pen 30 via wireless communications such as infrared communications, or wired communications. The controller 26 supplies the synchronization signal Ssync to the touch pen 30, as well. The controller 26 receives signals from the touch pen 30 to obtain information regarding the touch pen 30 (such as number of touch pens connected, and distance).

Further, the controller 26 determines the input mode based on an input from an external input/output device (I/O) or information from the touch pen 30. The controller 26 then supplies a switch signal Smod to the selector switches 24 to switch the selector switches 24.

The touch pen 30 includes an oscillator circuit 31. The touch pen 30 receives the synchronization signal Scync from the controller 26. Based on the synchronization signal Ssync, the touch pen 30 emits a signal synchronized with the drive unit 20 from the oscillator circuit 31.

Figure 2:
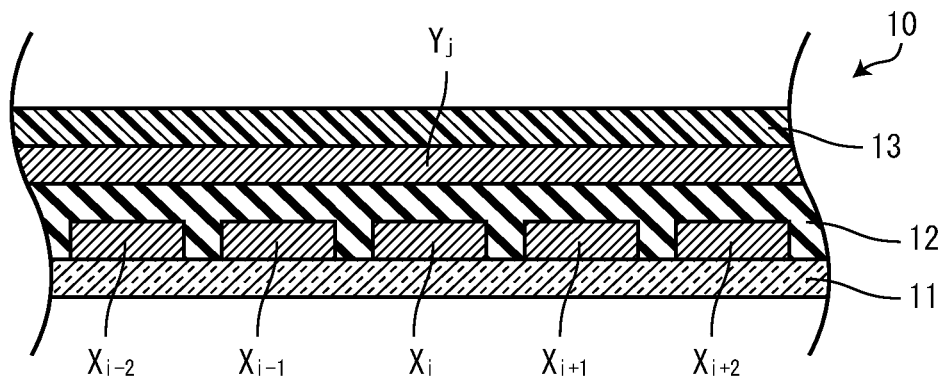
FIG. 2 is a cross-sectional view of the sensor unit of the coordinate position detection apparatus, taken along a particular second sensor electrode.

Turning to FIG. 2, the sensor unit 10 will be described in detail. FIG. 2 is a cross-sectional view of the sensor unit 10 of the coordinate position detection apparatus 100 along a second sensor electrode $Y_j$. The sensor unit 10 includes the first sensor electrodes $X_1$ to $X_m$ and the second sensor electrodes $Y_1$ to $Y_n$ and, in addition, a substrate 11, an insulating layer 12, and a protective layer 13.

The sensor unit 10 has the substrate 11, first sensor electrodes $X_1$ to $X_m$, insulating layer 12, second sensor electrodes $Y_1$ to $Y_n$, and protective layer 13 deposited in this order. The first sensor electrodes $X_1$ to $X_m$ and the second sensor electrodes $Y_1$ to $Y_n$ are provided in different layers that sandwich the insulating layer 12. This prevents the first sensor electrodes $X_1$ to $X_m$ and the second sensor electrodes $Y_1$ to $Y_n$ from contacting each other.

An exemplary method of fabricating the sensor unit 10 will be described below. The substrate 11 of the sensor unit 10 may be an insulating substrate such as a glass substrate. On the substrate 11 is formed a conductive film that is to provide first sensor electrodes $X_1$ to $X_m$. The conductive film may be, for example, a transparent conductive film such as indium tin oxide (ITO) or indium zinc oxide (IZO). The conductive film may be formed by sputtering, for example. Then, photolithography may be employed to form first sensor electrodes $X_1$ to $X_m$.

Thereafter, an insulating layer 12 is formed above the substrate 11 and the first sensor electrodes $X_1$ to $X_m$. The insulating layer 12 may be, for example, silicon oxide film or silicon nitride film. The insulating layer 12 may be formed using chemical vapor deposition (CVD), for example.

On the insulating layer 12 is formed a conductive film that is to provide second sensor electrodes $Y_1$ to $Y_n$. The conductive film used for the second sensor electrodes $Y_1$ to $Y_n$ may be made of the same material as that for the conductive film used for the first sensor electrodes $X_1$ to $X_m$, or may be made of a different material. Similar to the first sensor electrodes $X_1$ to $X_m$, the conductive film may be formed by sputtering, for example. Then, photolithography may be employed to form second sensor electrodes $Y_1$ to $Y_n$.

Thereafter, a protective layer 13 is formed above the insulating layer 12 and second sensor electrodes $Y_1$ to $Y_n$. The protective layer 13 may be, for example, an acrylic resin. The protective layer 13 may be formed, for example, by spin coating or spray methods. A further protective layer, such as a glass layer, may be provided thereon.

A construction of and a manufacturing method for the sensor unit 10 have been described. This construction is merely an example. In other implementations, the first sensor electrodes $X_1$ to $X_m$ and the second sensor electrodes $Y_1$ to $Y_n$ may be formed in the same layer and only those portions of these electrodes that cross each other may be formed in different layers.

Next, the operation of the coordinate position detection apparatus 100 of the present embodiment will be specifically described. The coordinate position detection apparatus 100 has two input modes: a pen-input mode where a coordinate is input by the touch pen 30 and a finger-input mode where a coordinate is input by a coordinate pointing means other than the touch pen 30, for example a finger. Switching between pen-input mode and finger-input mode may be done by hardware, for example, using an external switch, or by software through an interface implemented by the sensor unit 10. Or, the controller 26 may determine the state of the touch pen 30 based on a communication signal from the touch pen 30 for mode switching.

First, the operation of the coordinate position detection apparatus 100 according to the present embodiment performed when the apparatus is in pen-input mode will be described with reference to FIG. 1 and FIGS. 3 to 5.

When the apparatus is in pen-input mode, the controller 26 provides a switch signal Smod to switch all the selector switches 24 connected with the second sensor electrodes $Y_1$ to $Y_n$ (FIG. 1) to the second capacitance detectors 22. Thus, all the second sensor electrodes $Y_1$ to $Y_n$ are connected with the second capacitance detectors 22.

In the present embodiment, the first and second capacitance detectors 21 and 22 have the same construction. As such, when the apparatus is in the pen-input mode, the same processes occur for the first sensor electrodes $X_1$ to $X_m$ and the second sensor electrodes $Y_1$ to $Y_n$. Accordingly, in the following description, the process for the first sensor electrodes $X_1$ to $X_m$ will be mainly described. In other implementations, the first capacitance detectors 21 and the second capacitance detectors 22 may have different constructions.

Figure 3:
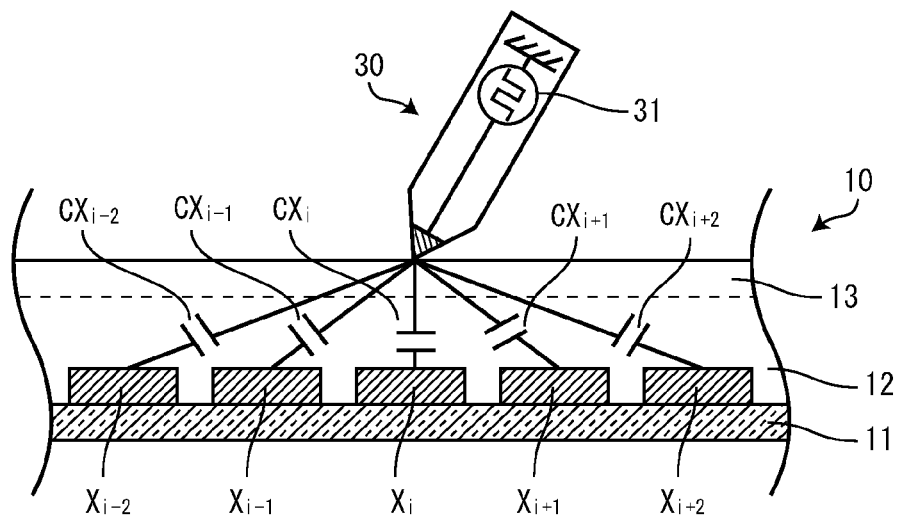
FIG. 3 is a conceptual diagram illustrating a touch pen in contact with the surface of the sensor unit 10 of the coordinate position detection apparatus.

FIG. 3 is a conceptual diagram illustrating the touch pen 30 being in contact with the surface of the sensor unit 10 of the coordinate position detection apparatus 100. When the touch pen 30 contacts the surface of the sensor unit 10, an input capacitance $CX_i$ is formed between the tip of the touch pen 30 and a first sensor electrode Xi. A signal emitted by the oscillator circuit 31 of the touch pen 30 is supplied to the first sensor electrode $X_i$, via the input capacitance $CX_i$.

Simultaneously, although not shown, an input capacitance $CY_j$ is formed between the tip of the touch pen 30 and a second sensor electrode $Y_j$. Again, a signal emitted by the oscillator circuit 31 of the touch pen 30 is supplied to the second sensor electrode $Y_j$ via the input capacitance $CY_j$.

Figure 4:
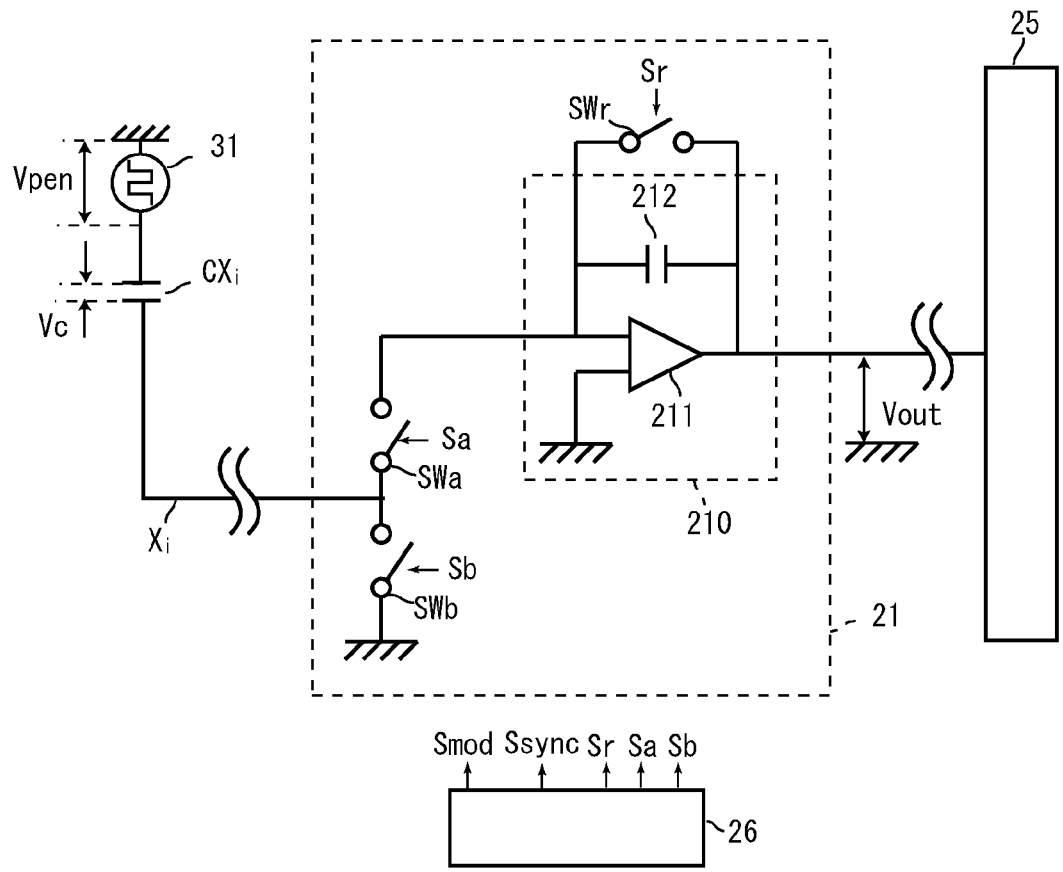
FIG. 4 is an equivalent circuit schematic of a first capacitance detector and associated elements as they are when the apparatus is in pen-input mode.

FIG. 4 is an equivalent circuit schematic of a first capacitance detector 21 and associated elements as they are when the apparatus is in pen-input mode. The first capacitance detector 21 includes an integration circuit 210 and switches SWr, SWa and SWb. The integration circuit 210 includes an operational amplifier 211 and an integration capacitance 212. The switches SWr, SWa and SWb are controlled by the control signals Sr, Sa and Sb provided by the controller 26.

The first sensor electrode Xi is connected with one connection of the switch SWa and one connection of the switch SWb, connected in parallel. The other connection of the switch SWa is connected with the inverting input (−) terminal of the operational amplifier 211, one electrode of the integration capacitance 212 and one connection of the switch SWr, connected in parallel. The other connection of the switch SWb is connected with ground. The non-inverting input (+) terminal of the operational amplifier is connected with ground. The output of the operational amplifier 211 is connected in parallel with the other electrode of the integration capacitance 212 and the other connection of the switch SWr, and connected with the coordinate computing unit 25.

Figure 5:
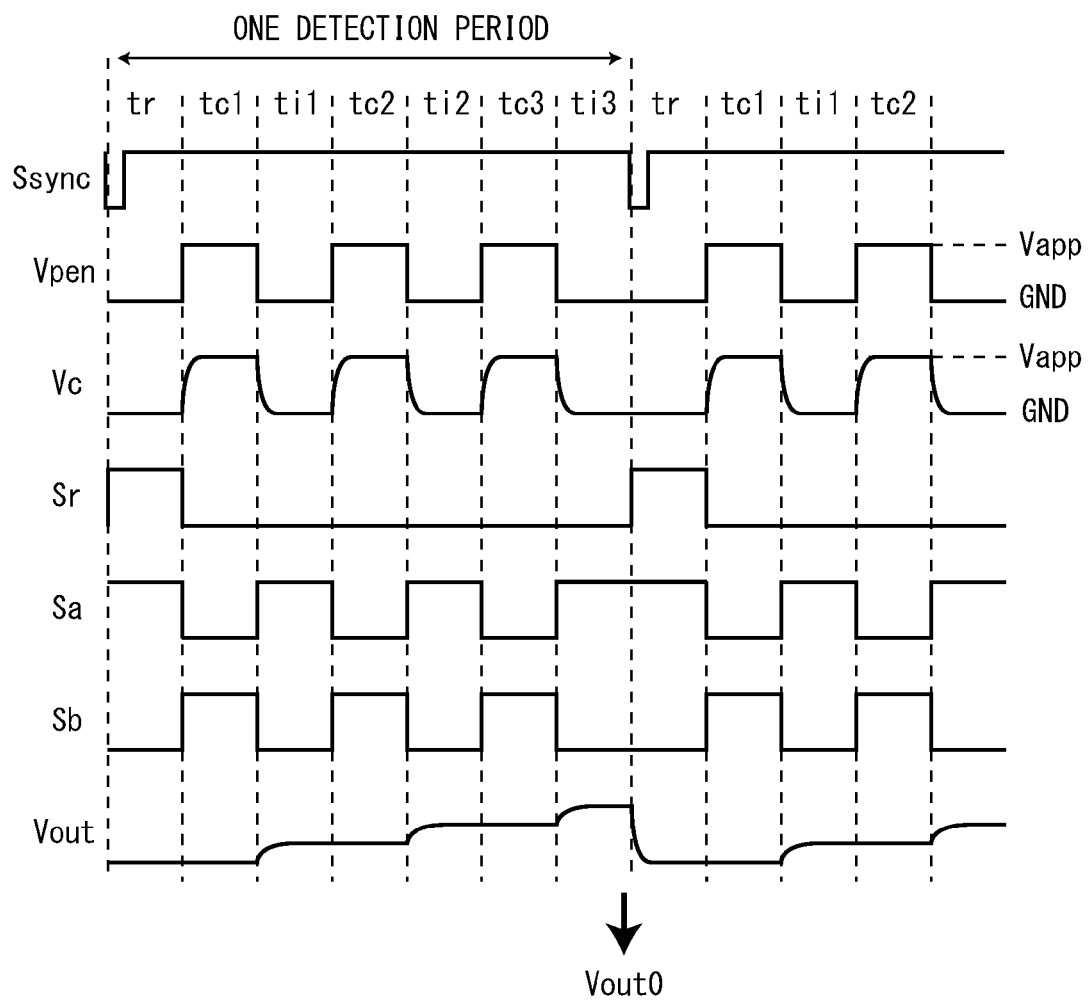
FIG. 5 is a signal waveform diagram illustrating the operation of the first capacitance detectors and other elements as they are when the apparatus is in pen-input mode.

FIG. 5 is a signal waveform diagram illustrating the operation of the first capacitance detectors 21 and other elements as they are when the apparatus is in pen-input mode. Vpen represents the output voltage of the oscillator circuit 31, Vc the difference in potential across the input capacitance $CX_i$, and Vout the output voltage of the integration circuit 210. As discussed above, Ssync represents a synchronization signal provided by the controller 26, and Sr, Sa and Sb represent control signals provided by the controller 26.

As shown in FIG. 5, a unit detection period includes one reset period tr, a plurality of charge periods tc1, tc2, . . . , and a plurality of integration periods ti1, ti2 . . . .

First, during the reset period tr, the control signals Sr, Sa and Sb cause the switches SWa and SWr to turn on and the switch SWb to turn off. As the switch SWr is on, the charge accumulated in the integration capacitance 212 is reset.

During the first charge period tc1, the control signals Sr, Sa and Sb cause the switch SWa to turn on and the switches SWr and SWa to turn off. Further, during this charge period tc1, the voltage Vapp is applied by the oscillator circuit 31 of the touch pen 30. That is, the value of the output voltage Vpen is equal to Vapp. Thus, a difference in potential equal to Vapp is produced across the input capacitance $CX_i$. That is, the value of the difference in potential Vc is equal to Vapp.

During the first integration period ti1, the control signals Sr, Sa and Sb cause the switch SWa to turn on and the switches SWr and SWb to turn off. As the switch SWa is on, the charge accumulated in the input capacitance $CX_i$ is transferred to the integration circuit 210. If Ci is the value of the input capacitance $CX_i$ and Cr is the value of the integration capacitance 212, the output voltage Vout of the integration circuit 210 is given by Vout=Vapp×Ci/Cr.

Thereafter, charge and integration periods similar to those discussed above are repeated such that the value of the output voltage Vout is successively accumulated. The value of the output voltage Vout is repeatedly accumulated until the next reset period begins, i.e. until the next detection period. In FIG. 5, charging and integration are repeated three times; however, any number of repetitions may be used. Charging and integration may only be done once. The more the number of repetitions during one detection period, the more the value of the accumulated output voltage Vout is, allowing the weaker signals to be detected. That is, the more the number of repetitions during one detection period, the higher the detection sensitivity is. At the end of the unit detection period, the value of the output voltage Vout, i.e. the output voltage Vout0, is input to the coordinate computing unit 25.

The coordinate computing unit 25 receives m values of the output voltage Vout0 derived from the output capacitances $CX_1$ to $CX_m$. Similarly, it receives n values of the output voltage Vout0 derived from the input capacitances $CY_1$ to $CY_n$. Based on these (m+n) values of the output voltage Vout0, the coordinate computing unit 25 determines the coordinate position of the touch pen 30 in contact with the sensor unit 10. Specifically, the X coordinate may be that of the point with the largest input capacitance $CX_i$, or that of the position of the weighted center of the m input capacitances $CX_i$. The same applies to the Y coordinate.

In the description of the present embodiment, the output voltage Vpen of the oscillator circuit 31 of the touch pen 30 is represented by a rectangular wave with two values, i.e. Vapp and GND. Alternatively, any waveform may be used for the output voltage Vpen, which may form a sinusoidal, triangular, or saw-tooth wave.

The operation of the coordinate position detection apparatus 100 according to the present embodiment performed when the apparatus is in pen-input mode has been described. In the coordinate position detection apparatus 100, each of the first sensor electrodes $X_1$ to $X_m$ is connected with a first capacitance detector 21 including an integration circuit 210. Thus, the apparatus is capable of sensing the input capacitances $CX_1$ to $CX_m$ simultaneously. Similarly, each of the second sensor electrodes $Y_1$ to $Y_n$ is connected with a second capacitance detector 22 including an integration circuit. Thus, the apparatus is capable of sensing the input capacitances $CY_1$ to $CY_n$ simultaneously. As such, the present embodiment only requires a process time of $1/(m+n)$ of that in implementations where the (m+n) sensor electrodes are successively scanned. That is, for the same process time, the number of times charging and integration can be repeated is (m+n) times that of such implementations. Thus, according to the present embodiment, a sufficient sensitivity will be provided even in the case of a sensor unit 10 with a larger area or a sensor unit 10 with increased resolution.

Next, the operation of the coordinate position detection apparatus 100 according to the present embodiment performed when the apparatus is in finger-input mode will be described with reference to FIGS. 1 and 6 to 8.

When the apparatus is in finger-input mode, the switch signal Smod from the controller 26 switches all the selector switches 24 connected with the second sensor electrodes $Y_1$ to $Y_n$ (FIG. 1) to the oscillator circuits 23. As such, all the second sensor electrodes $Y_1$ to $Y_n$ are connected with the oscillator circuits 23.

Figure 6:
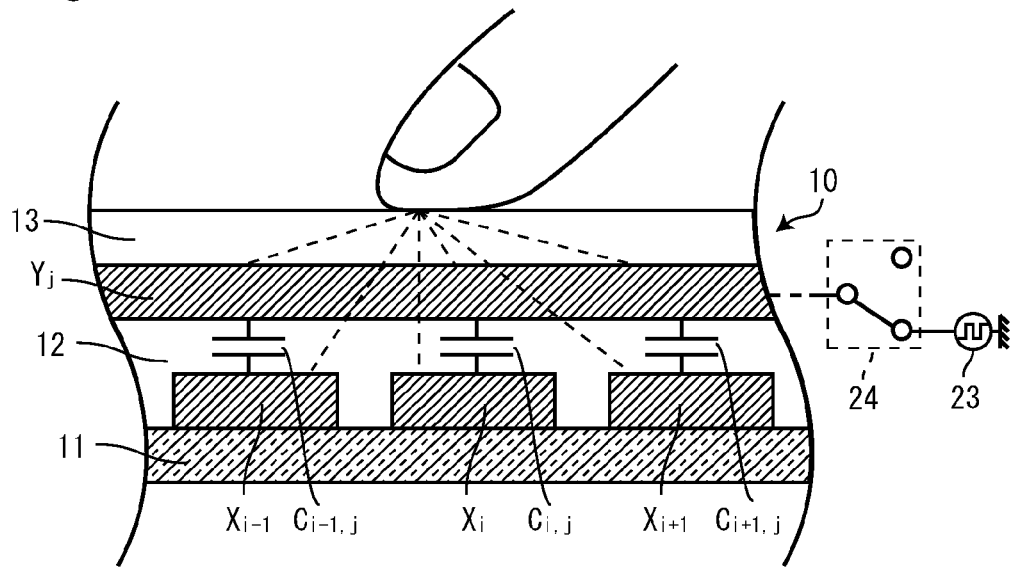
FIG. 6 is a conceptual diagram illustrating a finger in contact with the surface of the sensor unit 10 of the coordinate position detection apparatus 100.

FIG. 6 is a conceptual diagram illustrating a finger in contact with the surface of the sensor unit 10 of the coordinate position detection apparatus 100. A coupling capacitance $C_{i,j}$ is formed between a first sensor electrode $X_i$ and a second sensor electrode $Y_j$. When the finger contacts the surface of the sensor unit 10, a capacitance is also formed between the first sensor electrode $X_i$ and the finger and between the second sensor electrode $Y_j$ and the finger such that the positional relationship between these sensor electrodes and the finger changes the value of the coupling capacitance $C_{i,j}$.

Figure 7:
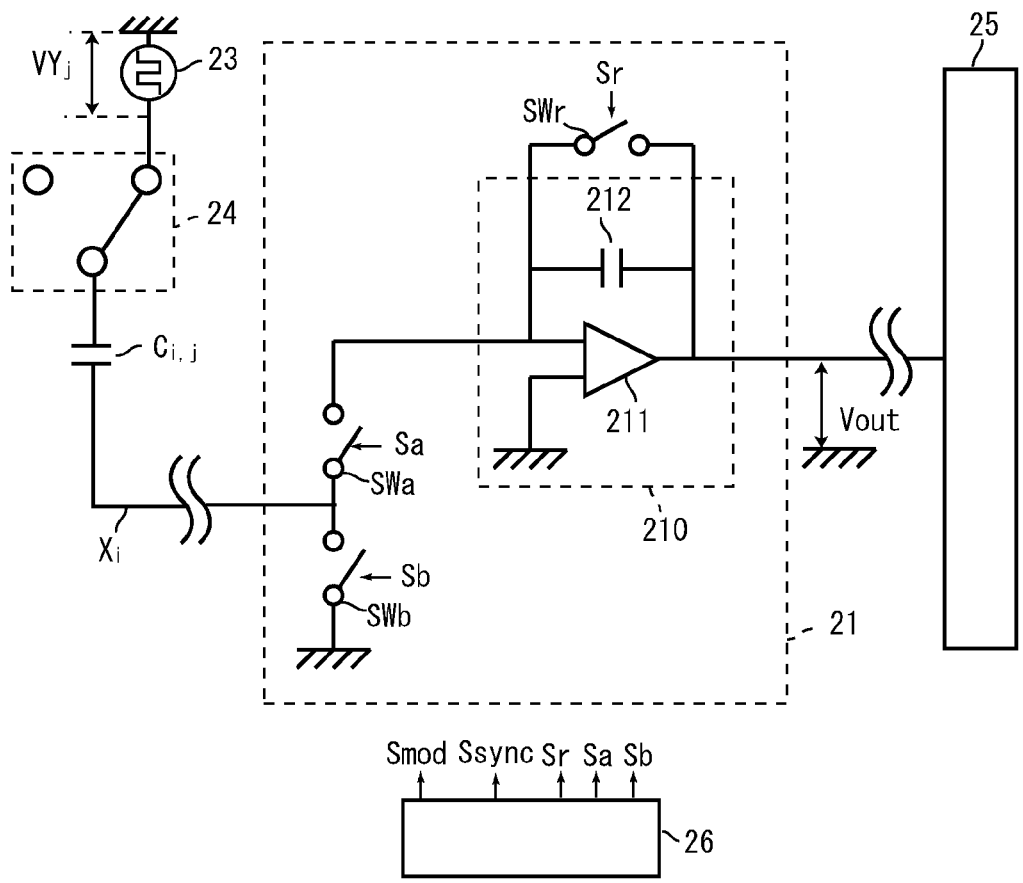
FIG. 7 is an equivalent circuit schematic of a first capacitance detector and associated elements as they are when the apparatus is in finger-input mode.

FIG. 7 is an equivalent circuit schematic of a first capacitance detector 21 and associated elements as they are when the apparatus is in finger-input mode. As will be apparent from FIG. 7, the circuitry of FIG. 7 is equivalent to that of FIG. 4. In FIG. 7, the oscillator circuit 31 of FIG. 4 is replaced by the oscillator circuit 23, and the input capacitance $CX_i$ of FIG. 4 is replaced by the coupling capacitance $C_{i,j}$.

In the present embodiment, when the apparatus is in finger-input mode, the coordinate computing unit 25 determines the coordinate position based on signals provided in a time division manner by the oscillator circuits 23 connected with the n second sensor electrodes.

Figure 8:
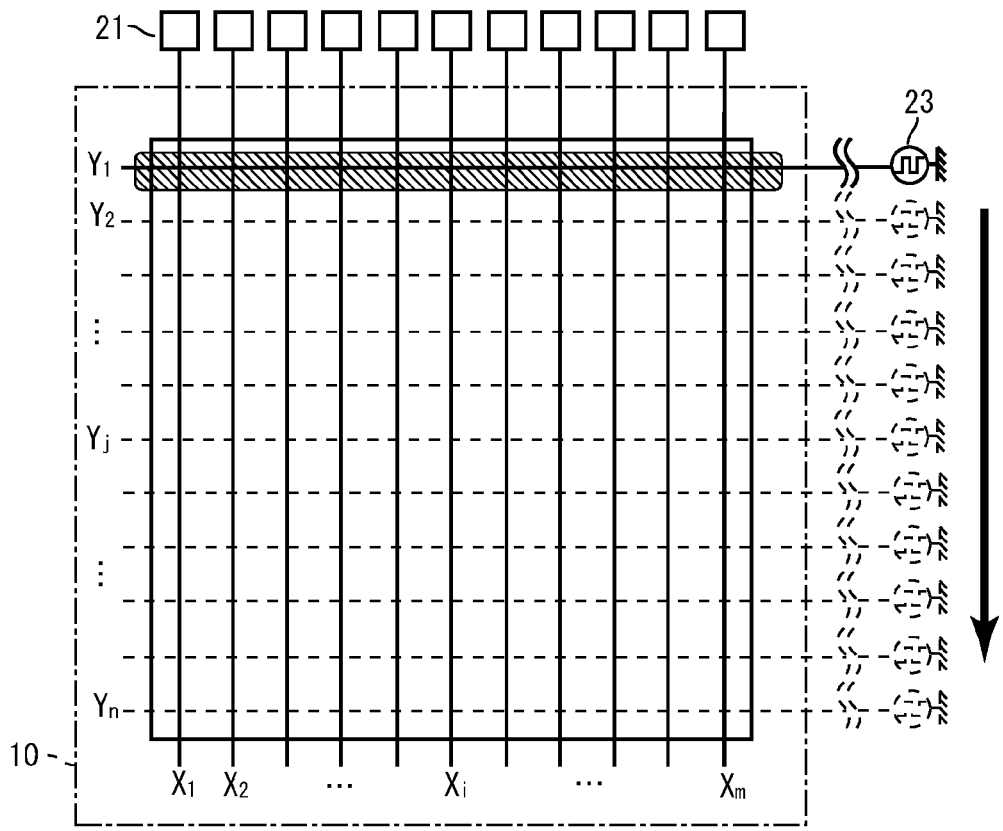
FIG. 8 schematically illustrates a method of detecting a coordinate position when the apparatus is in finger-input mode.
Figure 9:
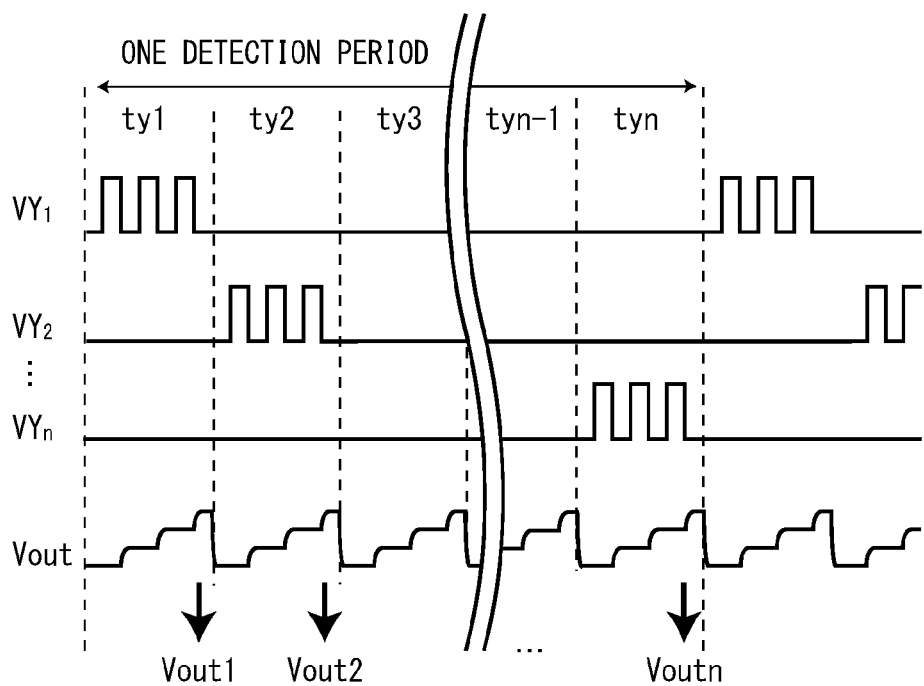
FIG. 9 is a signal waveform diagram illustrating the operation of the first capacitance detectors and other elements encountered when the apparatus is in finger-input mode.

FIG. 8 schematically illustrates a method of detecting a coordinate position when the apparatus is in finger-input mode. FIG. 9 is a signal waveform diagram illustrating the operation of the first capacitance detectors 21 and other elements encountered when the apparatus is in finger-input mode. $VY_j$ represents the output voltage from the oscillator circuit 23 connected with the j-th second sensor electrode $Y_j$. Vout represents the output voltage of the integration circuit 210.

When the apparatus is in finger-input mode, a unit detection period is equally divided into n sub-periods ty1 to tyn, and the n oscillator circuits 23 provide the signal $VY_j$ in a time division manner. Providing a signal in a time division manner, as used herein, means that, during each of the n sub-periods resulting from such division, only one oscillator circuit 23 provides a signal and the other oscillator circuits 23 do not provide a signal. That is, during the sub-period ty1, the oscillator circuit 23 connected with the first one of the second sensor electrodes $Y_1$ provides a signal. During the sub-period ty2, the oscillator circuit 23 connected with the second one of the second sensor electrodes $Y_2$ provides a signal. In the same way, during the sub-period tyj, the oscillator circuit 23 connected with the j-th one of the second sensor electrodes $Y_j$ provides a signal. Signals may be provided in an order different from that in which the second sensor electrodes $Y_j$ are arranged, as in this implementation.

In each sub-period tyj, the signals Sr, Sa and Sb and signals from the oscillator circuits 31 cause charging and integration. The operation of the first capacitance detectors 21 during these periods is the same as that described in connection with the pen-input mode, and thus their detailed description will not be made. In FIG. 9, charging and integration are repeated three times in a sub-period tyj; however, any number of repetitions may be used.

At the end of each sub-period tyj, the value of the output voltage Vout immediately before the integration capacitance 212 is reset, i.e. the output voltage Voutj, is successively supplied to the coordinate computing unit 25.

The coordinate computing unit 25 simultaneously receives data from the m first sensor electrodes $X_1$ to $X_m$. That is, during the sub-period ty1, the coordinate computing unit 25 receives m values of the output voltage Vout 1 derived from the coupling capacitance $C_{i,1}$. During the sub-period ty2, the coordinate computing unit 25 receives m values of the output voltage Vout 2 derived from the coupling capacitance $C_{i,2}$. In the same way, during the sub-period tyj, the coordinate computing unit 25 receives m values of the output voltage Voutj derived from the coupling capacitance $C_{i,j}$.

When one detection period is completed, the coordinate computing unit 25 determines the coordinate position of the finger in contact with the sensor unit 10 based on the (m×n) values of the output voltages Vout1 to Voutn that have been supplied. Specifically, the input coordinate may be that of the point of the largest coupling capacitance $C_{i,j}$, or may be that of the position of the weighted center of the (m×n) coupling capacitances $C_{i,j}$.

According to the present embodiment, values of the coupling capacitance $C_{i,j}$ may be obtained in the form of a two-dimensional array. As such, when a plurality of coordinates are input simultaneously, i.e. in a so-called multi-touch scenario, each coordinate position can be determined. For example, if there are a plurality of coupling capacitances $C_{i,j}$ not less than a predetermined value that are spaced apart at a predetermined distance, the process may be performed assuming that there were multiple touches.

The operation of the coordinate position detection apparatus 100 according to the present embodiment performed when the apparatus is in finger-input mode has been described. In the coordinate position detection apparatus 100, each of the first sensor electrodes $X_1$ to $X_m$ is connected with a first capacitance detector 21 including an integration circuit 210. Thus, the apparatus is capable of sensing the input capacitances $C_{1,j}$ to $C_{m,j}$ simultaneously. As such, the present embodiment only requires a process time of $n/(m+n)$ of that in implementations where the (m+n) sensor electrodes are successively scanned. That is, for the same process time, the number of times charging and integration can be repeated is $(m+n)/n$ times that of such implementations. Thus, according to the present embodiment, a sufficient sensitivity will be provided even in the case of a sensor unit 10 with a larger area or a sensor unit 10 with increased resolution.

Furthermore, the coordinate position detection apparatus 100 according to the present embodiment is switched between pen-input mode and finger-input mode as the switch signal Smod from the controller 26 switches the selector switches 24. Thus, one apparatus is capable of handling input by the touch pen 30 and input by the finger or the like. Further, a pen input and a finger input can be separated from each other. For example, an unintended input occurring when a finger contacts the sensor unit 10 during a pen input, for example, may be ignored.

Variation of First Embodiment

Figure 10:
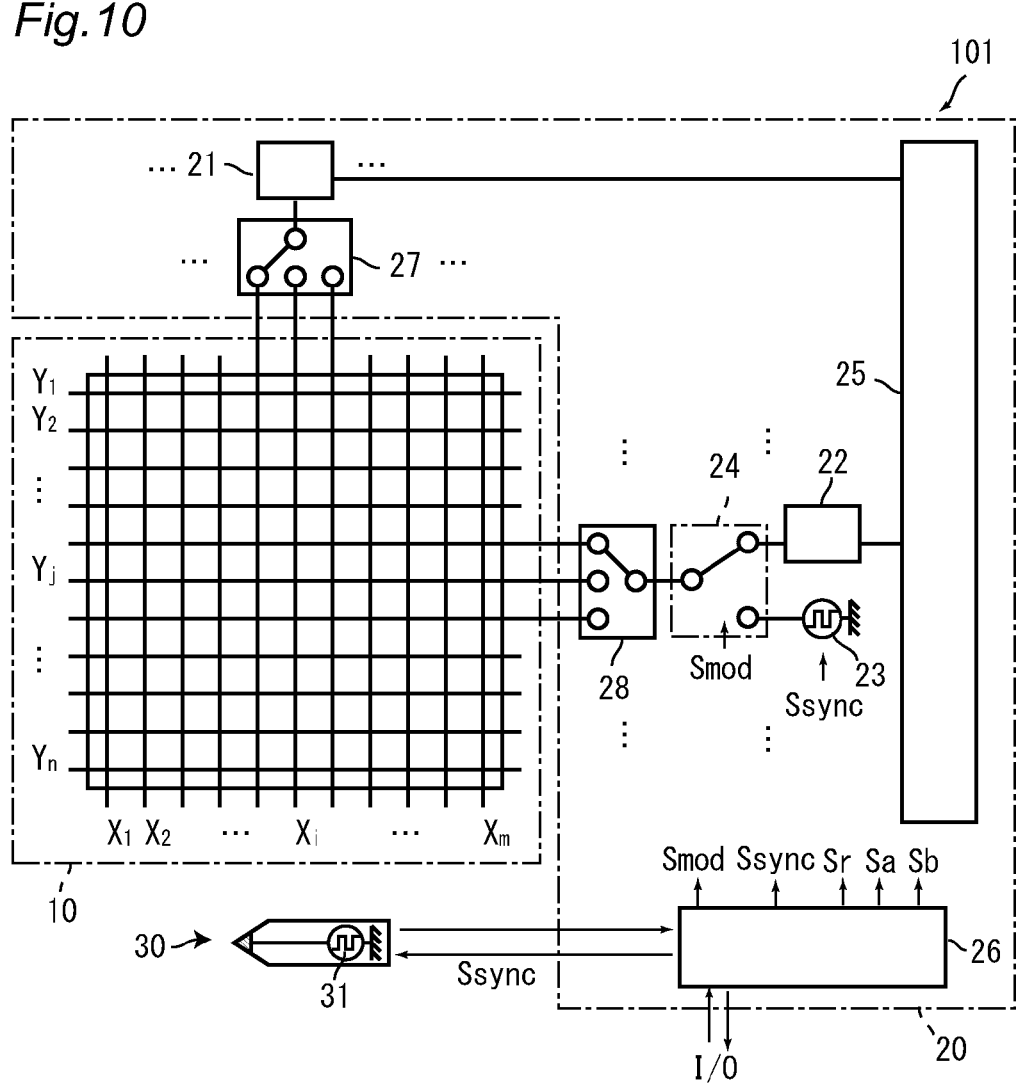
FIG. 10 is a block diagram schematically illustrating a coordinate position detection apparatus according to a variation of the first embodiment of the present invention.

FIG. 10 is a block diagram schematically illustrating a coordinate position detection apparatus 101 according to a variation of the first embodiment of the present invention. The coordinate position detection apparatus 101 according to the present variation is only different from the coordinate position detection apparatus 100 according to the first embodiment in the configuration of the drive unit 20.

Specifically, in the coordinate position detection apparatus 100, m first capacitance detectors 21 are provided, which means that the number of detectors is the same as that of the first sensor electrodes $X_1$ to $X_m$. In the coordinate position detection apparatus 101, m/3 multiplexers 27 and m/3 first capacitance detectors 21 are provided. Similarly, for n second sensor electrodes $Y_1$ to $Y_n$, n/3 multiplexers 28, n/3 second capacitance detectors 22, n/3 oscillator circuits 23 and n/3 selector switches 24 are provided.

One terminal of a multiplexer 27 is connected with a group of three first sensor electrodes $X_{i'}$, $X_{i'+1}$, $X_{i'+2}$ (i'=1, 4, 7, ..., m−2). The other terminal of the multiplexer 27 is connected with a first capacitance detector 21. The multiplexer 27 switches among the first sensor electrodes $X_{i'}$, $X_{i'+1}$, $X_{i'+2}$ successively for connection with the first capacitance detector 21. Similarly, one terminal of a multiplexer 28 is connected with a group of three second sensor electrodes $Y_{j'}$, $Y_{j'+1}$, $Y_{j'+2}$ (j'=1, 4, 7, ..., m−2). The other terminal of the multiplexer 28 is connected with a selector switch 24. The multiplexer 28 switches among the second sensor electrodes $Y_{j'}$, $Y_{j'+1}$, $Y_{j'+2}$ successively for connection with the selector switch 24.

In the coordinate position detection apparatus 101 of the present variation, the number of first capacitance detectors 21, second capacitance detectors 22, oscillator circuits 23 and selector switches 24 is one third of those of the coordinate position detection apparatus 100.

In the present variation, m/3 multiplexers 27 are provided, where one multiplexer 27 is connected with three first sensor electrodes. However, any number of multiplexers 27 may be used. The fewer the multiplexers 27 and the more the first sensor electrodes connected, the smaller the number of first capacitance detectors 21, second capacitance detectors 22, oscillator circuits 23 and selector switches 24 is. On the other hand, the number of times charging and integration are done during a unit detection period decreases in inverse proportion to the number of times the multiplexers 26 switches. The same applies to the multiplexers 28.

Second Embodiment

Figure 11:
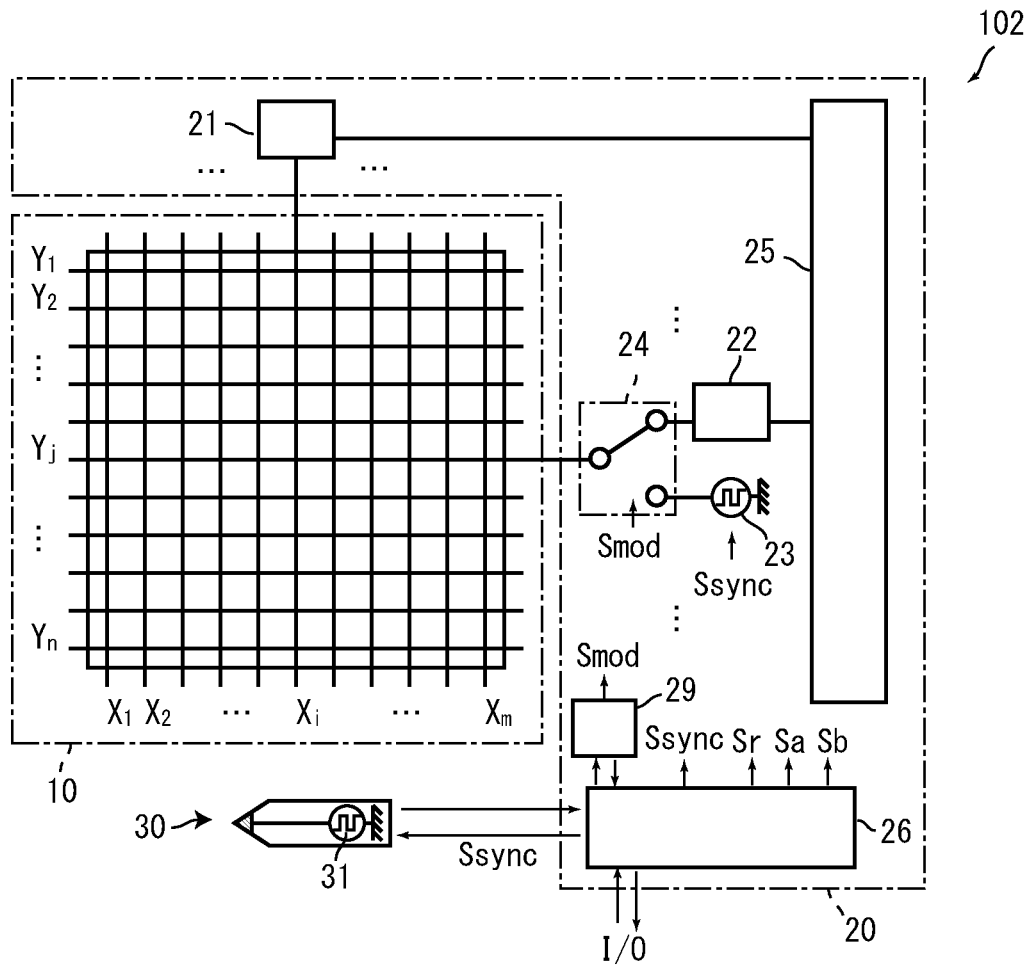
FIG. 11 is a block diagram schematically illustrating a coordinate position detection apparatus according to a second embodiment of the present invention.

FIG. 11 is a block diagram schematically illustrating a coordinate position detection apparatus 102 according to a second embodiment of the present invention. The coordinate position detection apparatus 102 includes the elements of the coordinate position detection apparatus 100 according to the first embodiment and, in addition, an input mode switching unit 29.

Figure 12:
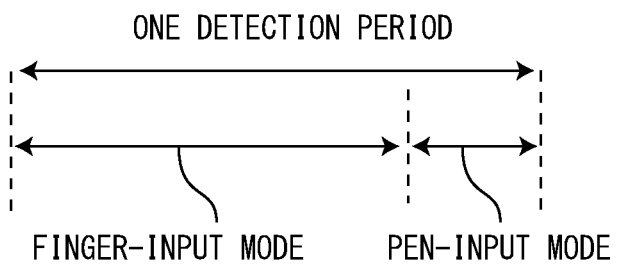
FIG. 12 illustrates switching between the input modes by the input mode switching unit in the second embodiment of the present invention.

FIG. 12 illustrates switching between the input modes by the input mode switching unit 29 in the second embodiment of the present invention. The input mode switching unit 29 automatically switches between finger-input mode and pen-input mode during a unit detection period in synchronization with the controller 26. FIG. 12 shows an implementation where the finger-input mode precedes the pen-input mode and the duration of the finger-input mode is longer than that of the pen-input mode. However, any order of the input modes and any proportion of the durations may be used.

According to the present embodiment, the user need not switch between the input modes using an external input/output device or the like. The user can perform input using a touch pen 30 or a finger without being aware of the input mode.

Alternatively, if an input by a touch pen 30 is detected when the apparatus is in pen-input mode, for example, an input occurring when the apparatus is in finger-input mode in the same detection period may be ignored. In this way, an unintended input occurring when a finger contacts the sensor unit 10 during a pen input, for example, may be ignored. Of course, in some implementations, both a pen input and a finger input may be accepted, or even priority may be given to a finger input.

Third Embodiment

A coordinate position detection apparatus according to a third embodiment of the present invention includes the elements of the coordinate position detection apparatus 100 according to the first embodiment and, in addition, a plurality of touch pens 30. In the present embodiment, when the apparatus is in pen-input mode, the coordinate computing unit 25 determines the coordinate position based on signals provided in a time division manner by the oscillator circuits 31 of a plurality of touch pens 30.

Figure 13:
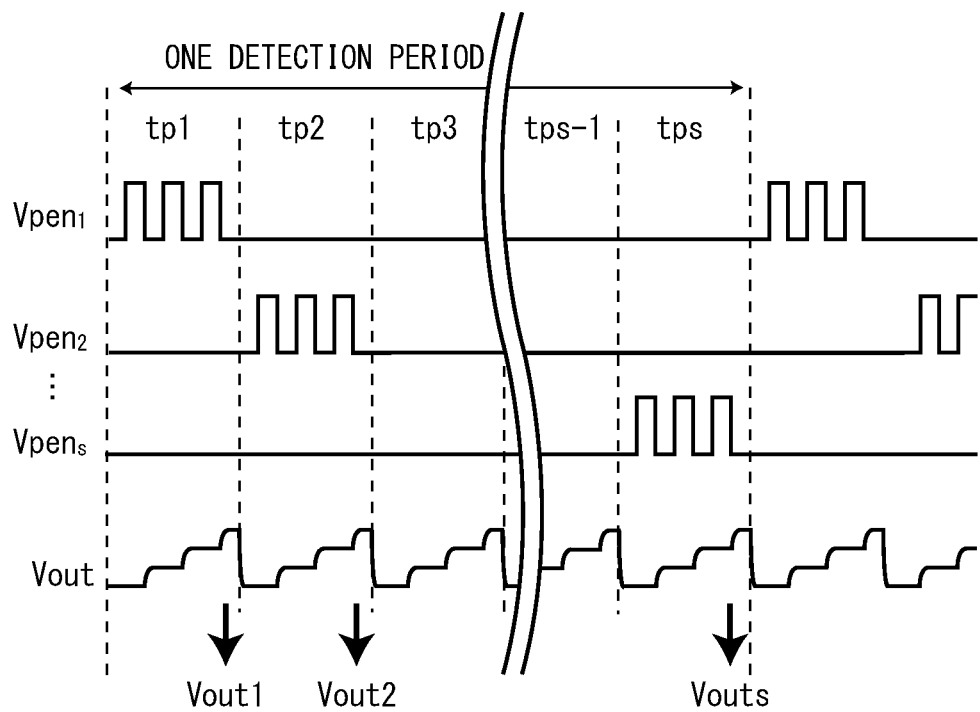
FIG. 13 is a signal waveform diagram illustrating output voltages from the oscillator circuits 31 of a plurality of touch pens and an output voltage from the integration circuit in a coordinate position detection apparatus according to a third embodiment.

In the following description, s is the number of touch pens 30 (s is an integer not less than 2; the same applies hereinafter). FIG. 13 is a signal waveform diagram illustrating output voltages from the oscillator circuits 31 of a plurality of touch pens 30 and an output voltage from the integration circuit in a coordinate position detection apparatus according to a third embodiment. $Vpen_k$ (k is an integer of 1 to s; the same applies hereinafter) represents the output voltage from the oscillator circuit 31 of the k-th touch pen 30. Vout represents the output voltage provided by an integration circuit 210 when that signal is supplied to the associated first capacitance detector 20.

In the present embodiment, one detection period is equally divided into s sub-periods tp1 to tps, and the s oscillator circuits 31 provide the output voltage $Vpen_k$ in a time division manner. That is, during the sub-period tp1, the oscillator circuit 31 of the first touch pen 30 provides a signal. During the sub-period tp2, the oscillator circuit 31 of the second touch pen 30 provides a signal. In the same way, during the sub-period tpk, the oscillator 31 of the k-th touch pen 30 provides a signal.

In each sub-period tpk, the signals Sr, Sa and Sb and signals from the oscillator circuit 31 cause charging and integration. The operation of the first capacitance detectors 21 during these periods is the same as that described in connection with the first embodiment, and thus their detailed description will not be made. In FIG. 11, charging and integration are repeated three times during a sub-period tpk; however, any number of repetitions may be used.

At the end of each sub-period tpk, the value of the output voltage Vout immediately before the integration capacitance 212 is reset, i.e. the output voltage Voutk, is successively supplied to the coordinate computing unit 25.

Thus, the output voltage Vout 1 from the first touch pen 30, the output voltage Vout 2 from the second touch pen 30, ... and the output voltage Voutk from the k-th touch pen 30 are successively supplied to the coordinate computing unit 25.

The coordinate computing unit 25 receives (m+n) values of the output voltage Voutk from the first sensor electrodes $X_1$ to $X_m$ and second sensor electrodes $Y_1$ to $Y_n$. Based on these values, the coordinate computing unit 25 determines the coordinate position of each touch pen 30. The coordinate computing unit 25 may successively process the received output voltages Vout1 to Vouts, or may process all the voltages as a single unit after all of them are received.

According to the present embodiment, even when a plurality of touch pens 30 provide an input simultaneously, each of them can be identified. Thus, simultaneous inputting by a plurality of touch pens 30 is possible.

Fourth Embodiment

Similar to the coordinate position detection apparatus according to the third embodiment, a coordinate position detection apparatus according to a fourth embodiment of the present invention includes a plurality of touch pens 30. The coordinate position detection apparatus according to the present embodiment is different from the coordinate position detection apparatus according to the third embodiment in how the plurality of touch pens 30 can be identified.

When the apparatus is in pen-input mode, the coordinate computing unit 25 of the present embodiment determines the coordinate position of each of s touch pens 30 based on signals perpendicular to each other provided by the oscillator circuits 31 of the touch pens 30.

Figure 14:
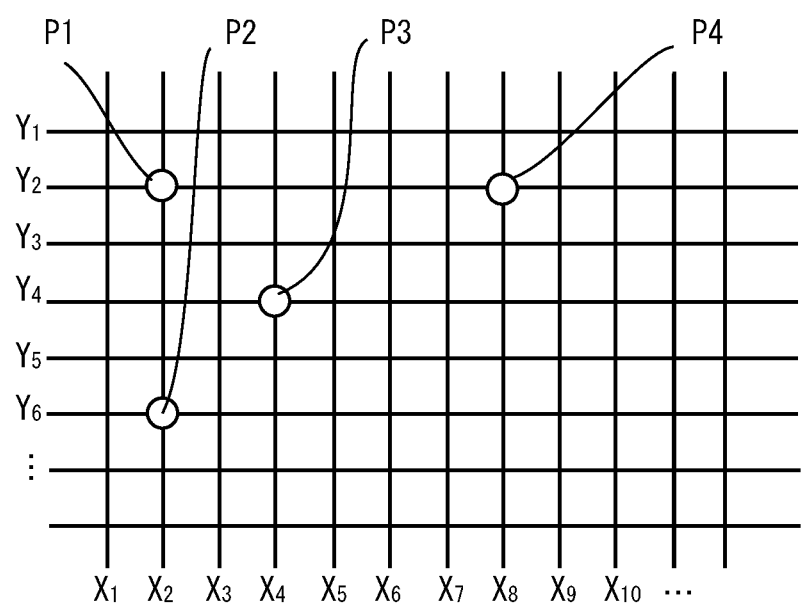
FIG. 14 schematically illustrates four touch pens being in contact with the sensor unit simultaneously.

The following description provides a specific example with four touch pens 30. FIG. 14 schematically illustrates four touch pens 30 being in contact with the sensor unit 10 simultaneously. In FIG. 14, a first touch pen P1 is in contact with the first sensor electrode $X_2$ and the second sensor electrode $Y_2$. A second touch pen P2 is in contact with the first sensor electrode $X_2$ and the second sensor electrode $Y_6$. Similarly, a third touch pen P3 is in contact with the first sensor electrode $X_4$ and the second sensor electrode $Y_4$. A fourth touch pen P4 is in contact with the first sensor electrode $X_8$ and the second sensor electrode $Y_2$.

Figure 15:
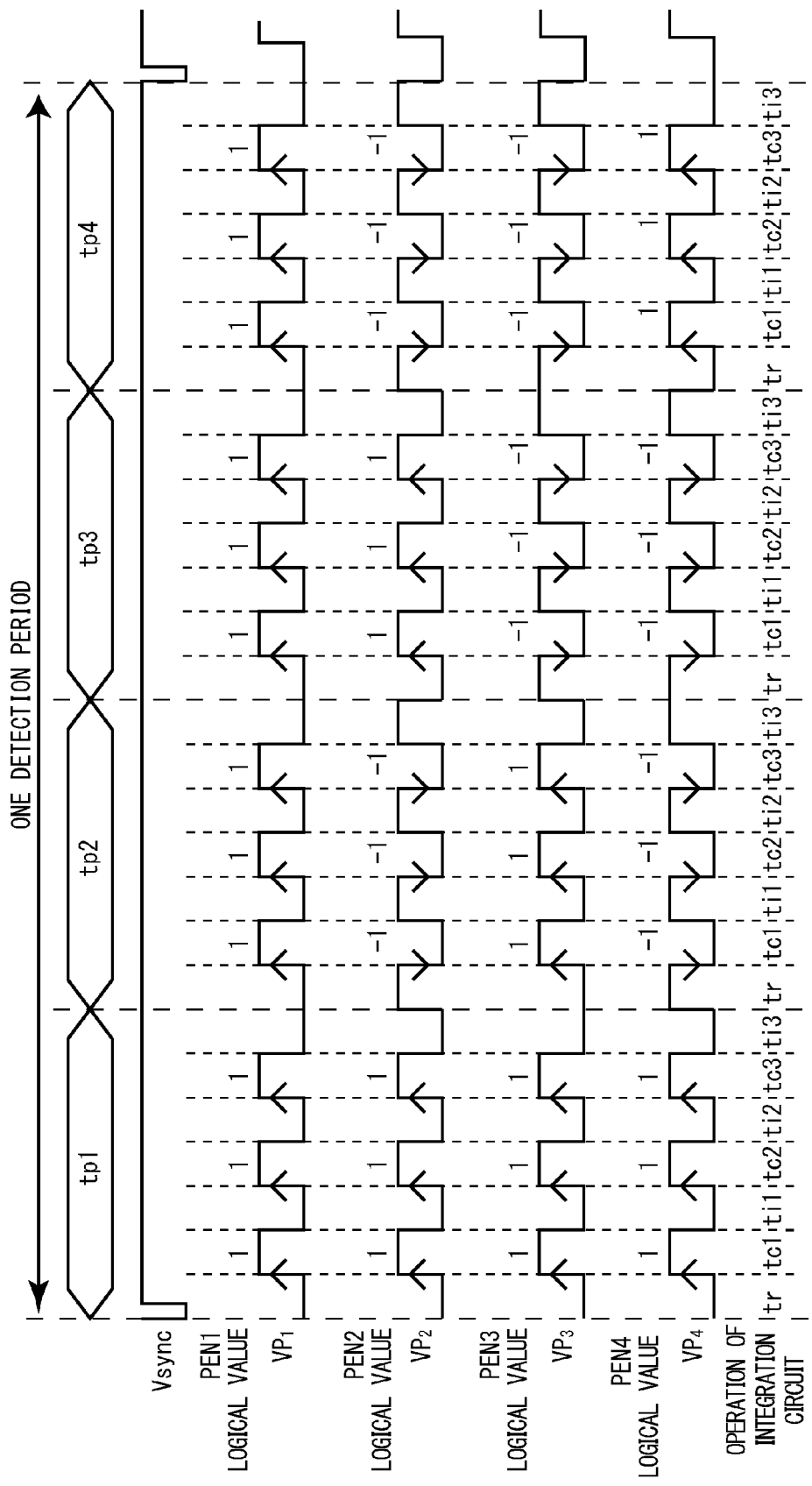
FIG. 15 is a signal waveform diagram illustrating output voltages from the oscillator circuits of four touch pens in a coordinate position detection apparatus according to a fourth embodiment.

FIG. 15 is a signal waveform diagram illustrating output voltages from the oscillator circuits 31 of four touch pens 30 in the coordinate position detection apparatus according to the fourth embodiment. $VP_1$ to $VP_4$ represent output voltages from the oscillator circuits 31 of the four touch pens 30. In the present embodiment, one detection period is divided into four sub-periods tp1 to tp4. Then, the phase of a signal from an oscillator circuit 31 is reversed depending on the sub-period to provide a signal of a bit string with two values, i.e. +1 and −1.

Specifically, the output voltage $VP_1$ is a rectangular wave that, in all the sub-periods tp1 to tp4, is at a high level (logic 1) during the charge periods (tc1 to tc3) and is at a low level (logic 0) during the reset periods (tr) and integration periods (ti1 to ti3). The output voltage $VP_2$ is a rectangular wave that, in the sub-periods tp1 and tp3, is at the high level during the charge periods and is at the low level during the reset periods and integration periods. In the sub-periods tp2 and tp4, the rectangular wave is at the low level during the charge periods and is at the high level during the reset periods and integration periods. That is, the output voltage $VP_2$ is phase-reversed during the sub-periods tp2 and tp4. Similarly, the output voltage $VP_3$ is phase-reversed during the sub-periods tp3 and tp4. The output voltage $VP_4$ is phase-reversed during the sub-periods tp2 and tp3.

The signal waveforms of the output voltages $VP_1$ to $VP_4$ are represented by the following column vectors, each with one row and four columns:

[Equation 1]

$$VP_1 = (+1, +1, +1, +1)$$

$$VP_2 = (+1, -1, +1, -1)$$

$$VP_3 = (+1, +1, -1, -1)$$

$$VP_4 = (+1, -1, -1, +1) \qquad (1).$$

The output voltages $VP_1$ to $VP_4$ satisfy the following: the signal waveforms of the output voltages $VP_1$ to $VP_4$ are perpendicular to each other. Here, p and q are each an integer of 1 to 4, $VP_T$ is a transposed matrix of VP, i.e. a column vector with four columns and one row.

[Equation 2]

$$VP_p VP_q^T = \begin{matrix} 4 & \dots & (p = q) \\ 0 & \dots & (p \neq q) \end{matrix} \qquad (2)$$

The following equation also holds:

[Equation 3]

$$\begin{pmatrix} VP_1 \\ VP_2 \\ VP_3 \\ VP_4 \end{pmatrix} (VP_1^T \quad VP_2^T \quad VP_3^T \quad VP_4^T) = \qquad (3)$$

$$\begin{pmatrix} VP_1 VP_1^T & VP_1 VP_2^T & VP_1 VP_3^T & VP_1 VP_4^T \\ VP_2 VP_1^T & VP_2 VP_2^T & VP_2 VP_3^T & VP_2 VP_4^T \\ VP_3 VP_1^T & VP_3 VP_2^T & VP_3 VP_3^T & VP_3 VP_4^T \\ VP_4 VP_1^T & VP_4 VP_2^T & VP_4 VP_3^T & VP_4 VP_4^T \end{pmatrix} = 4 \begin{pmatrix} 1 & 0 & 0 & 0 \\ 0 & 1 & 0 & 0 \\ 0 & 0 & 1 & 0 \\ 0 & 0 & 0 & 1 \end{pmatrix}.$$

The output voltages $VP_1$ to $VP_4$ may take any values as long as they satisfy Equations (2) and (3), and are not limited to Equation (1). Further, while the present embodiment describes output voltages $VP_1$ to $VP_4$ represented by signals of bit strings with two values, i.e. +1 and −1, the output voltages $VP_1$ to $VP_4$ may be in any signal waveforms.

Figure 16:
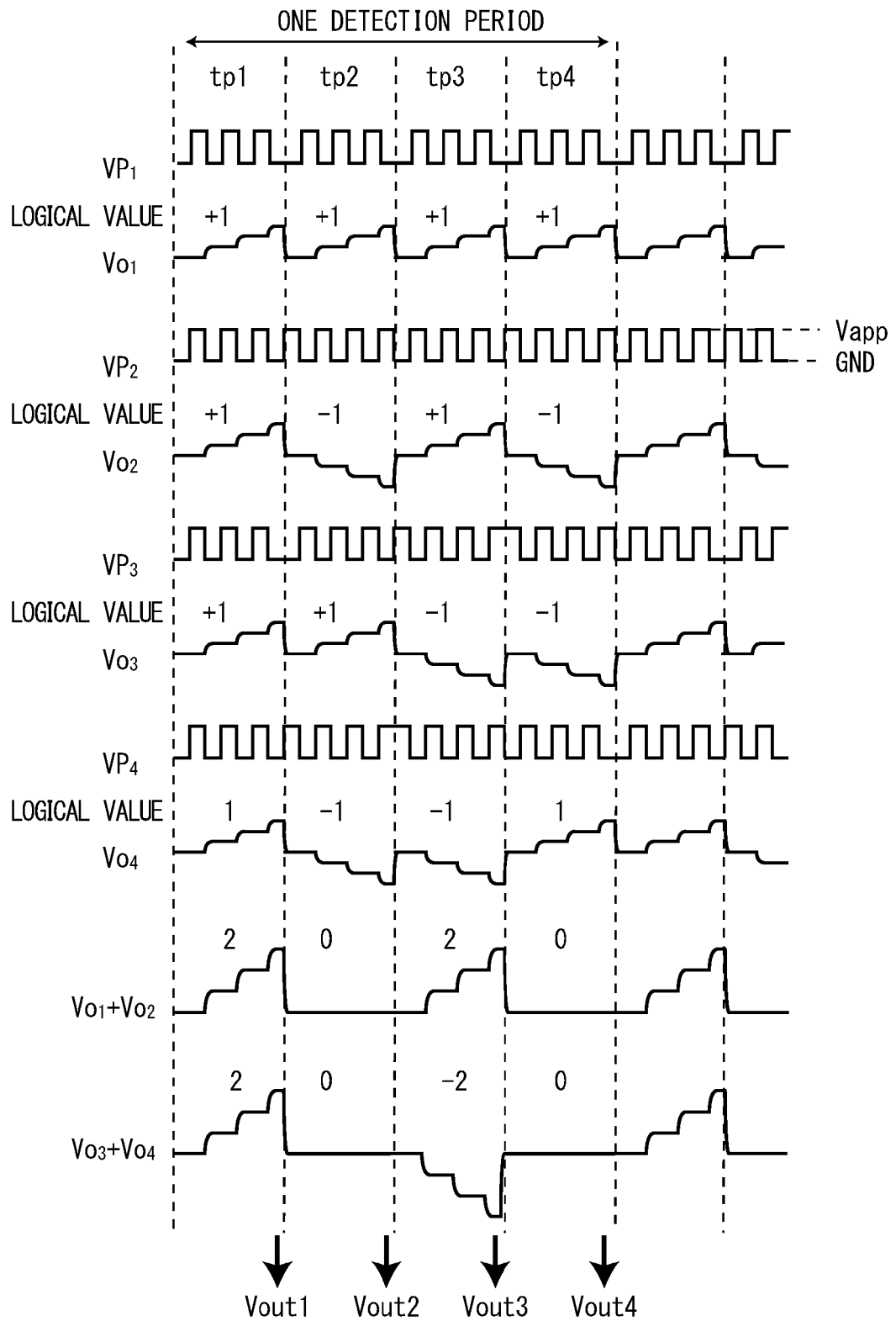
FIG. 16 is a signal waveform diagram illustrating output voltages from the four touch pens and output voltages from an integration circuit.

FIG. 16 is a signal waveform diagram illustrating output voltages from the four touch pens 30 and output voltages from an integration circuit 210. As discussed above, $VP_1$ to $VP_4$ represent output voltages from the oscillator circuits 31 of the four touch pens 30. $Vo_1$ to $Vo_4$ represent output voltages of the integration circuit 210 encountered when each of the output voltages $VP_1$ to $VP_4$ is supplied to the first capacitance detectors 20 independently. During the sub-periods where the output voltages $VP_1$ to $VP_4$ are phase-reversed, as shown in FIG. 15, the output voltages $Vo_1$ to $Vo_4$ are sign-reversed.

The first capacitance detectors 20 receive the output voltages $VP_1$ to $VP_4$ of the four touch pens 30 in an overlapping manner. FIG. 16 also shows the output voltage $Vo_1 + Vo_2$ of the integration circuit 210 encountered when the first touch pen P1 and second touch pen P2 are on the same line (for example, the first sensor electrode $X_2$ in FIG. 14), and the output voltage $Vo_3 + Vo_4$ of the integration circuit 210 encountered when the third touch pen P3 and fourth touch pen P4 are on the same line.

In the present embodiment, too, at the end of each of the sub-periods tp1 to tp4, the value of the output voltage Vout immediately before the integration circuit 210 is reset, i.e. the output voltages Vout1 to Vout4, are successively supplied to the coordinate computing unit 25. The output voltages Vout1 to Vout4 may be represented by the following equation, where $C_1$ to $C_4$ are input capacitances formed between the tip of the respective touch pens 30 and the associated sensor electrode, z is the number of times charging and integration are done, and Cr is the capacitance of the integration capacitance 212:

[Equation 4]

$$\begin{pmatrix} Vout1 \\ Vout2 \\ Vout3 \\ Vout4 \end{pmatrix} = z \times \frac{Vapp}{Cr} \times (VP_1^T \; VP_2^T \; VP_3^T \; VP_4^T) \begin{pmatrix} C_1 \\ C_2 \\ C_3 \\ C_4 \end{pmatrix} = \tag{4}$$

$$z \times \frac{Vapp}{Cr} \times \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C_1 \\ C_2 \\ C_3 \\ C_4 \end{pmatrix}.$$

FIG. 17 shows a table of examples of outputs provided when the touch pens are disposed as shown in FIG. 14. In FIG. 17, the constant term z×Vapp/Cr=1, and $C_1$ to $C_4$=1 (when there is an input) or 0 (when there is no input).

For example, the output voltage Vout1 from the integration circuit 210 connected with the first sensor electrode $X_1$ during the sub-period tp1 is given by 0×1+0×1+0×1+0×1=0. Similarly, the output voltage Vout1 from the integration circuit 210 connected with the first sensor electrode $X_2$ during the sub-period tp1 is given by 0×1+1×1+1×1+0×1=2. The output voltage Vout3 from the integration circuit 210 connected with the first sensor electrode $X_4$ during the sub-period tp3 is given by 0×1+0×1+1×(−1)+0×(−1)=−1.

The following equation may be derived from Equations (3) and (4):

[Equation 5]

$$\begin{pmatrix} C_1 \\ C_2 \\ C_3 \\ C_4 \end{pmatrix} = \frac{Cr}{4 \times z \times Vapp} \begin{pmatrix} VP_1 \\ VP_2 \\ VP_3 \\ VP_4 \end{pmatrix} \begin{pmatrix} Vout1 \\ Vout2 \\ Vout3 \\ Vout4 \end{pmatrix} = \tag{5}$$

$$\frac{Cr}{4 \times z \times Vapp} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Vout1 \\ Vout2 \\ Vout3 \\ Vout4 \end{pmatrix}.$$

Based on the above equation, the coordinate computing unit 25 converts the output voltages Vout1 to Vout4 to the input capacitances $C_1$ to $C_4$ from the touch pens 30. Based on $C_1$ to $C_4$, the coordinate position of each touch pen 30 is determined. The method of determining the coordinate position based on $C_1$ to $C_4$ is the same as that of the first embodiment.

FIG. 18 is a table of examples of outputs provided by the coordinate computing unit converting the examples of outputs of FIG. 17.

For example, the input capacitance $C_2$ between the tip of the second touch pen P2 and the first sensor electrode $X_1$ is given by 1×0+(−1)×0+1×0+(−1)×0=0. Similarly, the input capacitance $C_2$ between the tip of the second touch pen P2 and the first sensor electrode $X_2$ is given by 1×2+(−1)×0+1×2+(−1)×0=4. The input capacitance $C_3$ between the tip of the third touch pen P3 and the first sensor electrode $X_4$ is given by 1×2+1×0+(−1)×2+(−1)×0=4.

Thus, the output voltages Vout1 to Vout4 of Table 1 have effects of the four touch pens 30 mixed together. In contrast, in Table 2, the input capacitances $C_1$ to $C_4$ of the touch pens 30 are separated from each other.

Thus, in the present embodiment (fourth embodiment), too, a plurality of touch pens 30 that provide an input simultaneously can be identified. This allows a plurality of touch pens 30 to provide an input simultaneously.

If the signal waveforms of the output voltages $VP_1$ to $VP_s$ from s touch pens 30 in the preceding third embodiment are to be represented in a similar manner to that for Equation 1, the following may be used:

[Equation 6]

$$VP_1 = (+1, 0, 0, \ldots, 0) \tag{6}$$
$$VP_2 = (0, +1, 0, \ldots, 0)$$
$$\vdots$$
$$VP_s = (0, 0, 0, \ldots, +1)$$

In this case, too, the output voltages $VP_1$ to $VP_s$ satisfy the following: the signal waveforms of the output voltages $VP_1$ to $VP_s$ are perpendicular to each other. In this equation, p and a are each an integer of 1 to s.

[Equation 7]

$$VP_p VP_q^T = \begin{matrix} 1 \ldots (p = q) \\ 0 \ldots (p \neq q) \end{matrix}. \tag{7}$$

That is, in the preceding third embodiment, signals of bit strings with two values, i.e. +1 and 0, that are perpendicular to each other are provided. In contrast, in the present embodiment, signals of bit strings with two values, i.e. +1 and −1, that are perpendicular to each other are provided. As will be apparent from FIG. 12, in the present embodiment, charging and integration may be done using signals from all the touch pens 30 in an entire detection period. Thus, the present embodiment will provide a higher sensitivity than the third embodiment.

While four touch pens 30 are illustrated in the above description, any number of touch pens 30 may be used. Further, in the above description, one detection period is divided into four sub-periods, i.e. as many sub-periods as the touch pens 30. However, any number of sub-periods may be used as long as it is equal to or larger than the number of touch pens 30. Furthermore, in the above description, the output voltages $VP_1$ to $VP_4$ are rectangular waveforms. Alternatively, any waveform may be used for the output voltages $VP_1$ to $VP_4$, which may be sinusoidal, triangular, or saw-tooth waves.

Variation of Fourth Embodiment

Figure 19:
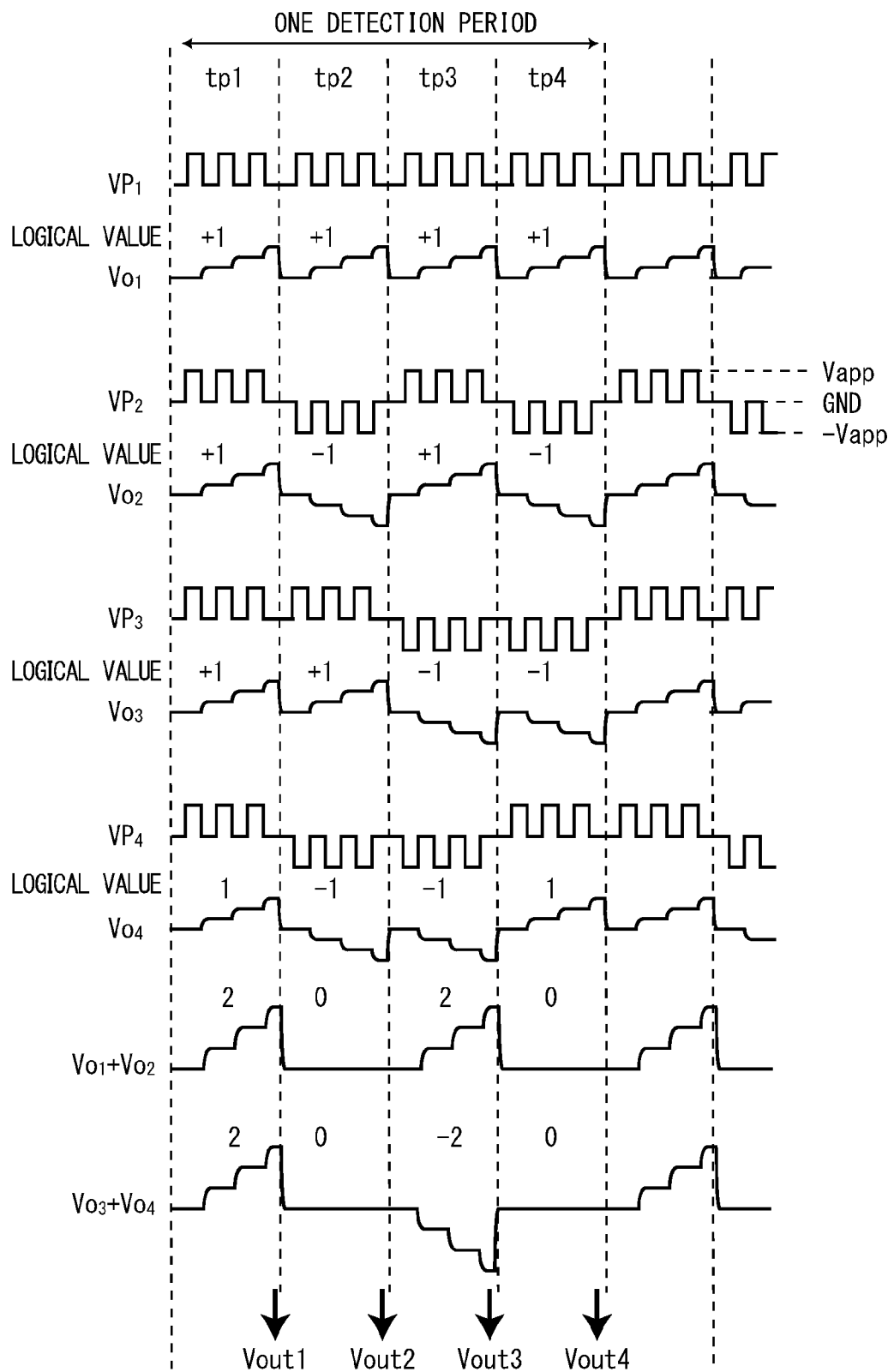
FIG. 19 is a signal waveform diagram illustrating output voltages from the oscillator circuits of four touch pens and output voltages from an integration circuit in a coordinate position detection apparatus according to a variation of the fourth embodiment.

FIG. 19 is a signal waveform diagram illustrating output voltages from the oscillator circuits 31 of four touch pens 30 and output voltages from an integration circuit in a coordinate position detection apparatus according to a variation of the fourth embodiment. In the fourth embodiment illustrated above, the output voltages are reversed by reversing their phase. In the present variation, the output voltages are reversed by reversing the sign of voltages applied.

Using such a signal waveform, a signal of a bit string with of two values of +1 and −1 may be provided, as well. Thus, in the present variation, too, signals of bit strings with two values, i.e. +1 and −1, that are perpendicular to each other may be provided to allow touch pens 30 to be identified separately.

Fifth Embodiment

Next, a coordinate position detection apparatus according to a fifth embodiment of the present embodiment will be described. When the apparatus is in finger-input mode, the coordinate computing unit 25 of the present embodiment determines the coordinate position based on signals perpendicular to each other emitted by the oscillator circuits 23 connected with n second sensor electrodes $Y_1$ to $Y_n$.

Figure 20:
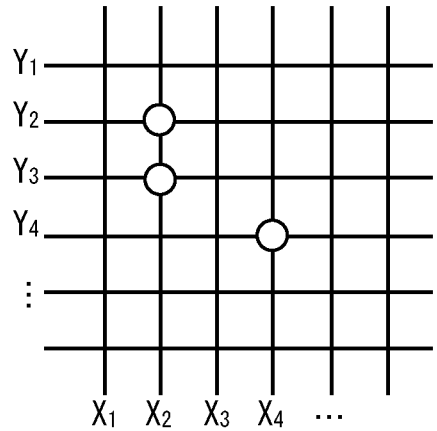
FIG. 20 schematically illustrates fingers being in contact with three points on the sensor unit simultaneously.

The following description provides a specific example where n=4. FIG. 20 schematically illustrates fingers being in contact with three points on the sensor unit 10 simultaneously. In FIG. 20, a finger is in contact with the first sensor electrode $X_2$ and the second sensor electrode $Y_2$. Similarly, a finger is in contact with the first sensor electrode $X_2$ and the second sensor electrode $Y_3$. A finger is in contact with the first sensor electrode $X_4$ and the second sensor electrode $Y_4$.

Figure 21:
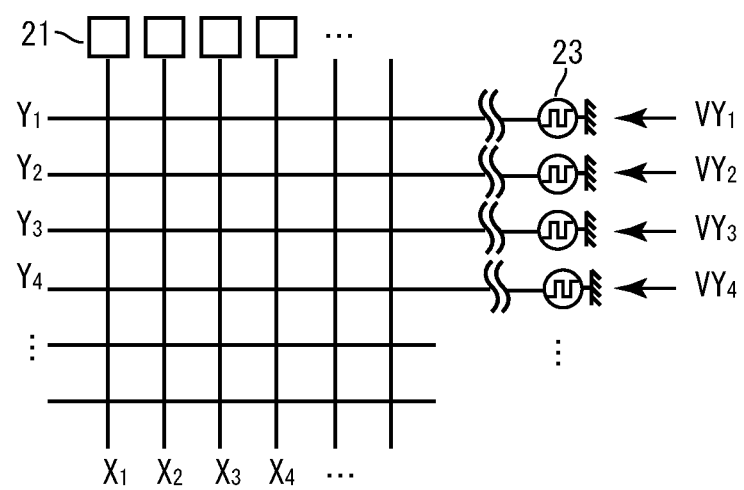
FIG. 21 schematically illustrates a method of detecting a coordinate position for a coordinate position detection apparatus according to a fifth embodiment, where the apparatus is in finger-input mode.

FIG. 21 schematically illustrates a method of detecting a coordinate position for a coordinate position detection apparatus according to a fifth embodiment, where the apparatus is in finger-input mode. As shown in FIG. 21, according to the present embodiment, output voltages $VY_1$ to $VY_4$ having signal waveforms perpendicular to each other are provided simultaneously by the oscillator circuits 23 connected with the second sensor electrodes $Y_1$ to $Y_4$.

The signals perpendicular to each other may be signals of bit strings with +1 and −1, as illustrated in connection with the fourth embodiment and its variation.

Figure 22:
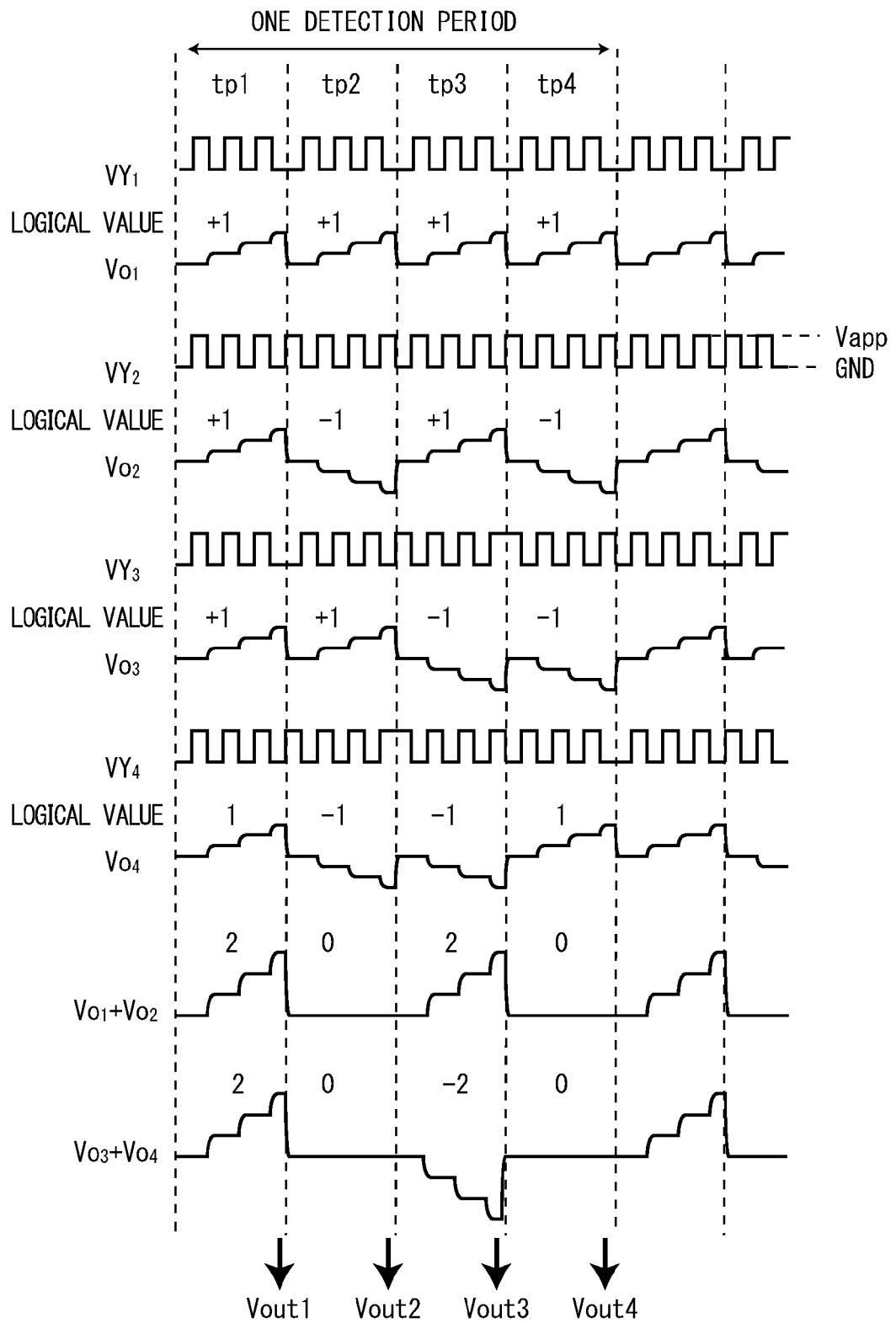
FIG. 22 is a signal waveform diagram illustrating output voltages from the oscillator circuits connected with four second sensor electrodes and output voltages from an integration circuit in a coordinate position detection apparatus according to a fifth embodiment.

FIG. 22 is a signal waveform diagram illustrating output voltages from the oscillator circuits 23 connected with four second sensor electrodes $Y_1$ to $Y_4$ and output voltages from an integration circuit in a coordinate position detection apparatus according to a fifth embodiment. Similar to preceding embodiments, $VY_1$ to $VY_4$ represent output voltages from the oscillator circuits 23 connected with four second sensor electrodes $Y_1$ to $Y_4$. $Vo_1$ to $Vo_4$ represent output voltages of the integration circuit 210 encountered when each of the output voltages $VY_1$ to $VY_4$ is supplied to the first capacitance detectors 20 independently. FIG. 22 shows, as an example, an output voltage $(Vo_1+Vo_2)$ of the integration circuit 210 encountered when the output voltages $VY_1$ and $VY_2$ are supplied to the first capacitance detectors 20 simultaneously and an output voltage $(Vo_3+Vo_4)$ of the integration circuit 210 encountered when the output voltages $VY_3$ and $VY_4$ are supplied to the first capacitance detectors 20 simultaneously.

Similar to Equation (1), the signal waveforms of the output voltages $VY_1$ to $VY_4$ may be represented by the following column vectors, each with one row and four columns:

[Equation 8]

$$VY_1 = (+1, +1, +1, +1)$$

$$VY_2 = (+1, -1, +1, -1)$$

$$VY_3 = (+1, +1, -1, -1)$$

$$VY_4 = (+1, -1, -1, +1) \quad (8)$$

In the present embodiment, too, at the end of each of the sub-periods tp1 to tp4, the value of the output voltage Vout immediately before the integration circuit 210 is reset, i.e. the output voltages Vout1 to Vout4, are successively supplied to the coordinate computing unit 25. The first capacitance detectors 20 receive the output voltages $VP_1$ to $VP_4$ in an overlapping manner. Thus, the output signals Vout1 to Vout4 may be represented in the following equation, where $C_{p,q}$ is the coupling capacitance of the p-th first sensor electrode $X_p$ and q-th second sensor electrode $Y_q$:

[Equation 9]

$$\begin{pmatrix} Vout1 \\ Vout2 \\ Vout3 \\ Vout4 \end{pmatrix} = z \times \frac{Vapp}{Cr} \times (VY_1^T \ VY_2^T \ VY_3^T \ VY_4^T) \begin{pmatrix} C_{i,1} \\ C_{i,2} \\ C_{i,3} \\ C_{i,4} \end{pmatrix} = $$

$$z \times \frac{Vapp}{Cr} \times \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} C_{i,1} \\ C_{i,2} \\ C_{i,3} \\ C_{i,4} \end{pmatrix}.$$

FIG. 23 is a table of examples of outputs provided when fingers are in contact with the sensor unit 10 as shown in FIG. 20. In FIG. 23, the constant term $z \times Vapp/Cr=1$, and $C_{p,q}=1$ (when there is an input) or 0 (when there is no input).

For example, the output voltage Vout1 from the integration circuit 210 connected with the first sensor electrode $X_1$ during the sub-period tp1 is given by $0 \times 1 + 0 \times 1 + 0 \times 1 + 0 \times 1 = 0$. Similarly, the output voltage Vout1 from the integration circuit 210 connected with the first sensor electrode $X_2$ during the sub-period tp1 is given by $0 \times 1 + 1 \times 1 + 1 \times 1 + 0 \times 1 = 2$. The output voltage Vout3 from the integration circuit 210 connected with the first sensor electrode $X_4$ during the sub-period tp3 is given by $0 \times 1 + 0 \times 1 + 0 \times (-1) + 1 \times (-1) = -1$. The value of the coupling capacitance $C_{p,q}$ may be determined using an equation deformation process similar to that used to derive Equation (5):

[Equation 10]

$$\begin{pmatrix} C_{p,1} \\ C_{p,2} \\ C_{p,3} \\ C_{p,4} \end{pmatrix} = \frac{Cr}{4 \times z \times Vapp} \begin{pmatrix} VY_1 \\ VY_2 \\ VY_3 \\ VY_4 \end{pmatrix} \begin{pmatrix} Vout1 \\ Vout2 \\ Vout3 \\ Vout4 \end{pmatrix} = $$

$$\frac{Cr}{4 \times z \times Vapp} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Vout1 \\ Vout2 \\ Vout3 \\ Vout4 \end{pmatrix}.$$

The coordinate computing unit 25 simultaneously receives data from m first sensor electrodes $X_1$ to $X_m$. When one detection period is completed, the coordinate computing unit 25 converts (m×4) values of the output voltages Vout1 to Vout4 that have been supplied to values of the coupling capacitance $C_{p,q}$ using Equation (10) to determine the coordinate position of a finger in contact with the sensor unit 10. The method of determining the coordinate position based on the coupling capacitance $C_{p,q}$ is the same as that of the first embodiment.

FIG. 24 is a table of examples of outputs provided by the coordinate computing unit converting the examples of outputs of FIG. 23.

For example, the input capacitance $C_{1,2}$ between the second sensor electrode $Y_2$ and the first sensor electrode $X_1$ is given by $1\times0+(-1)\times0+1\times0+(-1)\times0=0$. Similarly, the input capacitance $C_{2,2}$ between the second sensor electrode $Y_2$ and the first sensor electrode $X_2$ is given by $1\times2+(-1)\times0+1\times0+(-1)\times(-2)=4$. The input capacitance $C_{4,4}$ between the second sensor electrode $Y_4$ and the first sensor electrode $X_4$ is given by $1\times1+(-1)\times(-1)+(-1)\times(-1)+1\times1=4$.

Thus, the output voltages Vout1 to Vout4 of Table 3 have effects of four second sensor electrodes $Y_1$ to $Y_4$ mixed together. In contrast, in Table 4, the input capacitances $C_{p,q}$ of the second sensor electrodes $Y_1$ to $Y_4$ are separated from each other.

In the present embodiment, charging and integration may be done using signals from all the second sensor electrodes $Y_1$ to $Y_4$ in an entire detection period. Thus, the present embodiment will provide a higher sensitivity than the first embodiment.

In the above description, n=4 for purposes of explanation; however, the present embodiment is applicable if n is any integer not less than 2.

Other Embodiments

While embodiments of the present invention have been described, the present invention is not limited to the embodiments illustrated above, and various modifications are possible within the scope of the invention. Further, the first to fifth embodiments, the variation of the first embodiment and the variation of the fourth embodiment illustrated above may be combined in any suitable manner.

INDUSTRIAL APPLICABILITY

The present invention is useful in coordinate position detection apparatus.

The invention claimed is:

1. A coordinate position detection apparatus, comprising:
a plurality of sensor electrodes;
a plurality of capacitance detectors each connected with the plurality of sensor electrodes and including integration circuits;
a coordinate computer;
a coordinate pointing device including a first oscillator circuit;
a selector switch; and
a second oscillator circuit, wherein,
when the apparatus is in a first input mode where the coordinate pointing device inputs a coordinate position:
at least one of the plurality of capacitance detectors is configured to detect a signal provided by the coordinate pointing device,
the first oscillator circuit performs charging of at least one of the plurality of sensor electrodes and at least one of the plurality of capacitance detectors performs integration during a unit detection period to generate an output signal, and
based on the output signal, the coordinate computer determines the coordinate position;
the plurality of sensor electrodes include:
a first sensor electrode extending in a first direction, and
a second sensor electrode extending in a second direction which differs from the first direction,
the selector switch is provided between the plurality of sensor electrodes and the second oscillator circuit and the at least one of the plurality of capacitance detectors, and is configured to switch between the at least one of the plurality of capacitance detectors and the second oscillator circuit for connection to the second sensor electrode, and
when the apparatus is in a second input mode where a coordinate position is input by an alternative coordinate pointing device other than the coordinate pointing device, the selector switch causes the second sensor electrode to be connected with the second oscillator circuit, the at least one of the plurality of capacitance detectors which is connected to the first sensor electrode detects a signal provided by the second oscillator circuit, the second oscillator circuit performs charging and the at least one of the plurality of capacitance detectors which is connected to the first sensor electrode performs integration during the unit detection period to measure capacitances, and based on the capacitances measured, the coordinate computer determines the coordinate position.

2. The coordinate position detection apparatus according to claim 1, further comprising an input mode switching device configured to switch the apparatus between the first input mode and the second input mode successively during the unit detection period.

3. The coordinate position detection apparatus according to claim 1, wherein the coordinate computer determines the coordinate position based on signals provided by a plurality of second oscillator circuits in a time division manner when the apparatus is in the second input mode.

4. The coordinate position detection apparatus according to claim 1, wherein the coordinate computer determines the coordinate position based on signals perpendicular to each other provided by a plurality of second oscillator circuits when the apparatus is in the second input mode.

5. The coordinate position detection apparatus according to claim 4, wherein the signals perpendicular to each other provided by the plurality of second oscillator circuits include bit strings with +1 and −1.

6. The coordinate position detection apparatus according to claim 1, wherein the coordinate computer determines the coordinate position of each of a plurality of coordinate pointing devices based on signals provided by a plurality of first oscillation circuits in a time division manner when the apparatus is in the first input mode.

7. The coordinate position detection apparatus according to claim 1, wherein the coordinate computer determines the coordinate position of each of a plurality of coordinate pointing devices based on signals perpendicular to each other provided by a plurality of first oscillation circuits when the apparatus is in the first input mode.

8. The coordinate position detection apparatus according to claim 7, wherein the signals perpendicular to each other provided by a plurality of first oscillation circuits include bit strings with +1 and −1.

* * * * *